United States Patent
Kitayama et al.

(10) Patent No.: US 11,198,783 B2
(45) Date of Patent: Dec. 14, 2021

(54) DOPE FOR PRODUCING FILM AND FILM PRODUCTION METHOD

(71) Applicant: KANEKA CORPORATION, Osaka (JP)

(72) Inventors: Fuminobu Kitayama, Settsu (JP); Naoto Kataoka, Settsu (JP); Toru Yamatani, Takasago (JP); Katsumi Yamaguchi, Takasago (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 16/613,226

(22) PCT Filed: May 16, 2018

(86) PCT No.: PCT/JP2018/018895
§ 371 (c)(1),
(2) Date: Nov. 13, 2019

(87) PCT Pub. No.: WO2018/212227
PCT Pub. Date: Nov. 22, 2018

(65) Prior Publication Data
US 2020/0172720 A1    Jun. 4, 2020

(30) Foreign Application Priority Data
May 16, 2017 (JP) ............................. JP2017-097118

(51) Int. Cl.
| | | |
|---|---|---|
| *C08L 33/12* | (2006.01) | |
| *C08F 265/06* | (2006.01) | |
| *C08J 5/18* | (2006.01) | |
| *G02B 1/14* | (2015.01) | |
| *B29C 41/26* | (2006.01) | |
| *B29K 33/00* | (2006.01) | |
| *B29C 41/28* | (2006.01) | |

(52) U.S. Cl.
CPC ............ *C08L 33/12* (2013.01); *C08F 265/06* (2013.01); *C08J 5/18* (2013.01); *G02B 1/14* (2015.01); *B29C 41/26* (2013.01); *B29C 41/28* (2013.01); *B29K 2033/12* (2013.01); *C08J 2333/12* (2013.01); *C08J 2451/06* (2013.01); *C08L 2205/18* (2013.01); *C08L 2207/53* (2013.01)

(58) Field of Classification Search
CPC ........... C08L 33/12; C08F 265/06; C08J 5/18; G02B 1/14
USPC ......................................................... 428/220
See application file for complete search history.

(56) References Cited

U.S. PATENT DOCUMENTS

| | | | | |
|---|---|---|---|---|
| 3,793,402 A | * | 2/1974 | Owens | C08L 33/20 |
| | | | | 525/81 |
| 6,218,447 B1 | * | 4/2001 | Sugaya | C08F 285/00 |
| | | | | 523/201 |
| 6,811,850 B1 | * | 11/2004 | Hirata | G11B 7/256 |
| | | | | 428/343 |
| 2008/0073624 A1 | * | 3/2008 | Choi | C08F 279/06 |
| | | | | 252/582 |
| 2010/0270502 A1 | * | 10/2010 | Takimoto | C08J 5/18 |
| | | | | 252/299.01 |
| 2017/0362368 A1 | * | 12/2017 | Kitayama | C09D 151/003 |

FOREIGN PATENT DOCUMENTS

| | | | |
|---|---|---|---|
| JP | 55-27576 B2 | 7/1980 | |
| JP | 5-140410 A | 6/1993 | |
| JP | 6-179793 A | 6/1994 | |
| JP | 09157476 A * | 6/1997 | |
| JP | 3960631 B2 | 8/2007 | |
| JP | 2008-239739 A | 10/2008 | |
| JP | 2009-30001 A | 2/2009 | |
| JP | 2010-229201 A | 10/2010 | |
| JP | 2012-52023 A | 3/2012 | |
| WO | WO 2009/081607 A1 | 7/2009 | |
| WO | WO 2016/139927 A1 | 9/2016 | |
| WO | WO-2016139927 A1 * | 9/2016 | ............ C08L 51/003 |

OTHER PUBLICATIONS

Machine_English_translation_JP_09157476_A; Solvent-Resistant Acrylic Resin Composition and Its Molded Product; Jun. 17, 1997; EPO; whole document (Year: 1997).*
International Search Report dated Jul. 10, 2018 in PCT/JP2018/018895 filed on May 16, 2018.
Extended European Search Report dated Jan. 20, 2021 in corresponding European Patent Application No. 18802309.7, 8 pages.

* cited by examiner

*Primary Examiner* — Tahseen Khan
(74) *Attorney, Agent, or Firm* — Oblon, McClelland, Maier & Neustadt, L.L.P.

(57) ABSTRACT

Provided is a dope used when a film containing an acrylic-based resin and a core-shell type graft copolymer is made by a solution casting method, in which turbidity is less likely to occur despite the use of a core-shell type graft copolymer having a core layer with a large particle diameter. A dope for producing a film by a solution casting method contains a thermoplastic acrylic-based resin, a graft copolymer, and a solvent. In this dope, the graft copolymer has a core layer and a shell layer, the core layer has an average particle diameter of 125 to 400 nm, the graft copolymer has a degree of swelling by methyl ethyl ketone of 3.5 or more, and the solvent has a hydrogen bonding term $\delta H$ in a Hansen solubility parameter of 6.0 or more and 8.0 or less.

17 Claims, No Drawings

DOPE FOR PRODUCING FILM AND FILM PRODUCTION METHOD

TECHNICAL FIELD

The present invention relates to a dope for producing a film containing an acrylic-based resin and a graft copolymer, and a film production method.

BACKGROUND ART

Acrylic-based resins are excellent polymers used in large amounts in various industrial fields for their excellent transparency, color tone, appearance, weather resistance, gloss, and processability. Particularly, films formed by molding acrylic-based resins are used for various purposes, such as internal and exterior materials for cars, exterior materials for electric devices such as mobile phones and smartphones, and interior and exterior building materials for civil engineering and construction such as floors, windows, inner and outer walls, lighting portions, and road signs, by taking advantage of their excellent transparency, appearance, and weather resistance. In recent years, acrylic-based resins have been used for optical members of liquid crystal displays, organic EL displays, and the like by taking advantage of their excellent optical properties.

However, an essential disadvantage of acrylic-based resins is their poor impact resistance. As general methods for improving the impact resistance of an acrylic-based resin, various methods have been proposed in which a graft copolymer having a rubber layer (rubber-containing graft copolymer) is blended with an acrylic-based resin to exert strength (see, for example, PTL 1 to PTL 6).

As a representative of such rubber-containing graft copolymers, core-shell type graft copolymers containing rubber as a core layer are known and have already widely been used in producing molded articles or resin films obtained by injection molding, extrusion molding, or the like.

As a method of producing a high quality resin film, there has been known, for example, a melt extrusion method using a T-die and a solution casting method in which a dope obtained by dissolving a resin in a solvent is cast on the surface of a support and then the solvent is evaporated to form a film. The melt extrusion method using a T-die has a disadvantage that the resulting film is likely to have a difference in physical properties between an extrusion direction and a direction perpendicular to the extrusion direction, and residual orientation is likely to occur. On the other hand, the solution casting method has an advantage that orientation of a polymer does not occur because physical pressure is not applied to the film, and directionality is less likely to occur in the strength and optical properties of the film. In addition to extremely high film thickness accuracy, the amount of heat given to the resin is small, and there is also an advantage that the amount of a heat stabilizer or the like added can be reduced.

CITATION LIST

Patent Literature

PTL 1: JP-B No. S55-27576
PTL 2: JP-B No. 3960631
PTL 3: JP-A No. H06-179793
PTL 4: JP-A No. H05-140410
PTL 5: JP-A No. 2009-30001
PTL 6: JP-A No. 2012-52023

SUMMARY OF INVENTION

Technical Problem

The core-shell type graft copolymer described above is generally provided as a powdery product which is an aggregate of primary particles that is obtained by aggregating primary particles (submicron order) made through emulsion polymerization and that generally has a particle diameter of several microns to several tens of millimeters. In order to dissolve such a core-shell type graft copolymer in a solvent together with an acrylic-based resin and use the prepared solution in a solution casting method, it is required to dissolve and disperse the powder of the core-shell type graft copolymer as an aggregate and the acrylic-based resin in the solvent and prepare a homogeneous polymer solution (hereinafter referred to as a dope).

However, since the conventional core-shell type graft copolymer is such that the primary particles are strongly aggregated or welded together, even if the core-shell type graft copolymer is dissolved and dispersed in a solvent, there is a portion that cannot be dissolved uniformly, and as a result, there has been a problem that the obtained dope becomes turbid on appearance. This problem is remarkable when a core-shell type graft copolymer including a core layer with a large particle diameter, which is excellent in strength modification efficiency, is used for the purpose of enhancing film strength and the like.

When the dope is turbid, lumps tend to be formed in the dope. Accordingly, foreign substances resulting from aggregation, dispersion failure of rubber particles, or the like easily tend to be generated in a film obtained by the solution casting method, or the dope is entirely or partially gelled, which causes insufficient fluidity of the dope, and difficulties occur when the solution casting method is performed. In addition, there is a concern about a significant decline in productivity that when foreign substances in the dope are filtered and removed through a fine mesh filter, the filter is clogged, so that the filtration cannot be continued. Thus, it may be difficult to produce a film having good transparency, appearance, optical properties, mechanical properties and the like by the solution casting method.

Under the above circumstances, an object of the present invention is to provide a dope used when a film containing an acrylic-based resin and a core-shell type graft copolymer is made by a solution casting method, in which turbidity is less likely to occur despite the use of a core-shell type graft copolymer having a core layer with a large particle diameter.

Solution to Problem

The present inventors have found that the aforementioned problem can be solved by using, as a solvent contained in a dope, a solvent having a hydrogen bonding term $\delta H$ in a Hansen solubility parameter in a specific range and using, as a core-shell type graft copolymer, a graft copolymer in which a degree of swelling by methyl ethyl ketone is adjusted so as to fall within a specific range. This finding has led to the completion of the present invention.

That is, the present invention relates to a dope for producing a film by a solution casting method, the dope containing a thermoplastic acrylic-based resin, a graft copolymer, and a solvent, in which the graft copolymer has a core layer and a shell layer, the core layer has an average particle diameter of 125 to 400 nm, the graft copolymer has a degree of swelling by methyl ethyl ketone of 3.5 or more, and the solvent has a hydrogen bonding term δH in a Hansen solubility parameter of 6.0 or more and 8.0 or less.

The graft copolymer preferably has a degree of swelling by methyl ethyl ketone of 3.6 or more and 5.0 or less.

The graft copolymer preferably has a swellability coefficient S of 10.5 to 18.0, the swellability coefficient S being represented by (degree of swelling by methyl ethyl ketone/soft polymer ratio in graft copolymer)/(soft polymer ratio in core layer).

The core layer preferably has a polymer terminal structure composed of an alkylthio group.

Preferably, the shell layer may be a single layer or a multilayer, and a polymer constituting the single layer or a polymer constituting a layer having a highest glass transition temperature among the multilayers has a glass transition temperature of 92° C. or lower.

The graft copolymer preferably has a gel fraction of 90% or less.

Preferably, the core layer has a hard polymer (I) containing, as structural units, 40 to 100% by weight of a methacrylic ester unit (a-1), 60 to 0% by weight of another monomer unit (a-2) having a double bond copolymerizable with the methacrylic ester unit, and 0.01 to 10 parts by weight of a polyfunctional monomer unit per 100 parts by weight of a total amount of the (a-1) and the (a-2), and a soft polymer (II) containing, as structural units, 60 to 100% by weight of an acrylic ester unit (b-1), 0 to 40% by weight of another monomer unit (b-2) having a double bond copolymerizable with the acrylic ester unit, and 0.1 to 5 parts by weight of a polyfunctional monomer unit per 100 parts by weight of a total amount of the (b-1) and the (b-2), the soft polymer (II) is bonded to the hard polymer (I), the shell layer includes a hard polymer (III) containing, as structural units, 60 to 100% by weight of a methacrylic ester unit (c-1), 40 to 0% by weight of another monomer unit (c-2) having a double bond copolymerizable with the methacrylic ester unit, and 0 to 10 parts by weight of a polyfunctional monomer unit per 100 parts by weight of a total amount of the (c-1) and the (c-2), and the hard polymer (I) is graft-bonded to the hard polymer (I) and/or the soft polymer (II).

The hard polymer (I) preferably has a polymer terminal structure composed of an alkylthio group.

The thermoplastic acrylic-based resin preferably has a weight average molecular weight of 300,000 or more. In addition, the thermoplastic acrylic-based resin preferably has a weight average molecular weight of 170,000 or less.

The thermoplastic acrylic-based resin is preferably a polymer containing, as structural units, 30 to 100% by weight of a methyl methacrylate unit and 0 to 70% by weight of another vinyl-based monomer unit copolymerizable with the methyl methacrylate unit.

The thermoplastic acrylic-based resin preferably has a ring structure in a main chain, and the ring structure is at least one selected from the group consisting of a glutarimide ring structure, a lactone ring structure, a ring structure derived from maleic anhydride, a ring structure derived from maleimide, and a glutaric anhydride ring structure.

An amount of the thermoplastic acrylic-based resin blended is preferably 40 to 98 parts by weight and an amount of the graft copolymer blended is preferably 60 to 2 parts by weight, per 100 parts by weight of a total of the amount of the thermoplastic acrylic-based resin blended and the amount of the graft copolymer blended.

The present invention also relates to a method for producing an acrylic-based resin film by a solution casting method, the method including a step of evaporating a solvent after casting the dope on a surface of a support. Preferably, the dope is prepared by making a pellet containing a thermoplastic acrylic-based resin and a graft copolymer, and then dissolving and dispersing the pellet in the solvent.

Furthermore, the present invention also relates to an acrylic-based resin film including the above-mentioned dope. The acrylic-based resin film preferably has a thickness of 10 to 500 μm. The acrylic-based resin film is preferably a laminating protective film for a surface of another substrate. The acrylic-based resin film is preferably an optical film, and the optical film is more preferably a polarizer protective film.

Furthermore, the present invention also relates to a polarizing plate including a polarizer and the acrylic-based resin film being stacked, and also relates to a display device including the polarizing plate.

Advantageous Effects of Invention

According to the present invention, it is possible to provide a dope used when a film containing an acrylic-based resin and a core-shell type graft copolymer is made by a solution casting method, in which turbidity is less likely to occur despite the use of a core-shell type graft copolymer having a core layer with a large particle diameter. The acrylic-based resin film produced by the solution casting method using the dope of the present invention has few foreign substances in the film and is excellent in transparency, appearance, optical properties, mechanical properties and the like.

DESCRIPTION OF EMBODIMENTS

Hereinbelow, embodiments of the present invention will be described in detail. However, the present invention is not limited to these embodiments.

The dope of the present invention contains a thermoplastic acrylic-based resin, a graft copolymer, and a solvent, and is a dope used for producing a film by a solution casting method. In the dope of the present invention, the thermoplastic acrylic-based resin and the graft copolymer are dissolved or dispersed in a solvent. These components will be described below.

(Thermoplastic Acrylic-Based Resin)

The thermoplastic acrylic-based resin contained in the dope of the present invention may be a resin containing, as a structural unit, a vinyl-based monomer including a (meth)acrylic ester, and may be a known thermoplastic acrylic-based resin. In particular, preferred is a thermoplastic acrylic-based resin containing a structural unit derived from a methacrylic ester, and more preferred is an acrylic-based resin containing 30% by weight or more, and more preferably 50% by weight or more of an alkyl methacrylare ester unit whose alkyl group has 1 to 4 carbon atoms. From the viewpoint of thermal stability, still more preferred is a thermoplastic acrylic-based resin containing, as structural units, 30 to 100% by weight of a methyl methacrylate unit and 70 to 0% by weight of another vinyl-based monomer unit copolymerizable therewith.

The other vinyl-based monomer copolymerizable with methyl methacrylate is preferably, for example, a (meth)acrylic ester whose alkyl group has 1 to 10 carbon atoms (except for methyl methacrylate). Specific examples of the other vinyl-based monomer copolymerizable with methyl methacrylate include: methacrylic esters such as ethyl methacrylate, propyl methacrylate, butyl methacrylate, cyclohexyl methacrylate, 2-ethylhexyl methacrylate, benzyl methacrylate, octyl methacrylate, glycidyl methacrylate, epoxycyclohexylmethyl methacrylate, dimethylaminoethyl methacrylate, 2-hydroxyethyl methacrylate, 2-hydroxypropyl methacrylate, dicyclopentanyl methacrylate, 2,2,2-trifluoroethyl methacrylate, 2,2,2-trichloroethyl methacrylate, isobornyl methacrylate, methacrylamide, and N-methylol methacrylamide; acrylic esters such as methyl acrylate, ethyl acrylate, propyl acrylate, butyl acrylate, 2-ethylhexyl acrylate, octyl acrylate, glycidyl acrylate, epoxycyclohexylmethyl acrylate, 2-hydroxyethyl acrylate, 2-hydroxypropyl acrylate, acrylamide, and N-methylol acrylamide; carboxylic acids such as methacrylic acid and acrylic acid, and salts thereof; vinyl cyanides such as acrylonitrile and methacrylonitrile; vinyl arenes such as styrene, α-methylstyrene, monochlorostyrene, and dichlorostyrene; maleimides such as N-phenylmaleimide, N-cyclohexylmaleimide, and N-methylmaleimide; maleic acid, fumaric acid, and esters thereof; vinyl halides such as vinyl chloride, vinyl bromide, and chloroprene; vinyl esters such as vinyl formate, vinyl acetate, and vinyl propionate; alkenes such as ethylene, propylene, butylene, butadiene, and isobutylene; alkene halides; and polyfunctional monomers such as allyl methacrylate, diallyl phthalate, triallyl cyanurate, monoethylene glycol dimethacrylate, tetraethylene glycol dimethacrylate, tetraethylene glycol dimethacrylate, and divinyl benzene. These vinyl-based monomers may be used singly or in combination of two or more of them.

From the viewpoint of optical properties, appearance, weather resistance, and heat resistance, the amount of methyl methacrylate contained in the thermoplastic acrylic-based resin as a structural unit is preferably 30 to 100% by weight, more preferably 50 to 100% by weight, still more preferably 50 to 99.9% by weight, and particularly preferably 50 to 98% by weight, and the amount of the other vinyl-based monomer copolymerizable with methyl methacrylate is preferably 70 to 0% by weight, more preferably 50 to 0% by weight, still more preferably 50 to 0.1% by weight, and particularly preferably 50 to 2% by weight. It is to be noted that from the viewpoint of processability and appearance, the thermoplastic acrylic resin does not preferably contain a polyfunctional monomer.

The weight average molecular weight of the thermoplastic acrylic-based resin is not particularly limited, but is preferably 300,000 or more. When the weight average molecular weight is in this range, the resulting film is tough, and handling becomes easy when the film is applied to various purposes. The weight average molecular weight is also preferably 170,000 or less. When the weight average molecular weight is in this range, the viscosity of the dope is low, so that the dope can be adjusted to a higher concentration, film formation by a solvent casting method becomes easier, and high productivity can be achieved. The weight average molecular weight can be measured using gel permeation chromatography (GPC) under the following conditions.

(Device Conditions)
Measuring device: HLC-8220GPC (Tosoh Corporation)
Detector: RI detector (built-in)
Solvent: Tetrahydrofuran
Guard column: TSKguardcolumn SuperHZ-H (4.6×35 mm) (Tosoh Corporation)
Analysis column: TSKgel SuperHZM-H (6.0×150 mm) (Tosoh Corporation)
Measurement temperature: 40° C.
Standard substance: Standard polystyrene (Tosoh Corporation)

A glass transition temperature of the thermoplastic acrylic-based resin contained in the dope of the present invention can be set according to the conditions to be used and purposes. When the thermoplastic acrylic resin is used for purposes not requiring excellent heat resistance, the glass transition temperature may be lower than 115° C., but is preferably 90° C. or higher from the viewpoint of heat resistance during use. On the other hand, when the thermoplastic acrylic resin is used for purposes requiring heat resistance, the thermoplastic acrylic resin is preferably a thermoplastic acrylic-based resin having a glass transition temperature of 115° C. or higher and excellent heat resistance. The glass transition temperature of the thermoplastic acrylic-based resin is more preferably 118° C. or higher, still more preferably 120° C. or higher, and most preferably 125° C. or higher.

An example of the thermoplastic acrylic-based resin having excellent heat resistance includes an acrylic-based resin having a ring structure in its main chain. Examples of the ring structure include a glutarimide ring structure, a lactone ring structure, a ring structure derived from maleic anhydride, a ring structure derived from maleimide (including a ring structure derived from N-substituted maleimide), and a glutaric anhydride ring structure. An example of the thermoplastic acrylic-based resin having excellent heat resistance also includes an acrylic-based resin containing a (meth)acrylic acid structural unit in its molecule.

Specific examples of the thermoplastic acrylic-based resin having excellent heat resistance include a maleimide acrylic-based resin (acrylic-based resin copolymerized with a non-substituted or N-substituted maleimide compound as a copolymerization component), a glutarimide acrylic-based resin, a lactone ring-containing acrylic-based resin, an acrylic-based resin containing a hydroxyl group and/or a carboxyl group, a methacrylic-based resin, a partially hydrogenated styrene unit-containing acrylic-based polymer obtained by partially hydrogenating an aromatic ring of a styrene-containing acrylic-based polymer obtained by polymerization of a styrene monomer and another monomer copolymerizable therewith, and an acrylic-based polymer containing a cyclic acid anhydride structure such as a glutaric anhydride structure or a structure derived from maleic anhydride. Among them, from the viewpoint of improving the heat resistance of an acrylic-based resin film, a lactone ring-containing acrylic-based resin, a maleimide acrylic-based resin, a glutarimide acrylic-based resin, a glutaric anhydride structure-containing acrylic-based resin, a maleic anhydride structure-containing acrylic-based resin, and an acrylic-based polymer containing 97 to 100% by weight of methyl methacrylate and 3 to 0% by weight of methyl acrylate are preferable. Among these, a glutarimide acrylic-based resin and a maleimide acrylic-based resin are particularly preferable for their excellent optical properties. A glutarimide acrylic-based resin and a maleimide acrylic-based resin may be used in combination. Both the resins are excellent in compatibility, and therefore high transparency can be maintained and excellent optical properties can be achieved. In addition, high thermal stability and solvent resistance can be achieved.

An example of the maleimide acrylic-based resin includes a maleimide acrylic-based resin having a maleimide unit (corresponding to a ring structure derived from maleimide) represented by the following general formula (5) and a (meth)acrylic ester unit:

[Chemical Formula 1]

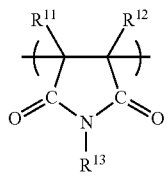

(5)

(wherein $R^{11}$ and $R^{12}$ are each independently a hydrogen atom, an alkyl group having 1 to 12 carbon atoms, or an aryl group having 6 to 14 carbon atoms, and $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following group A:

group A: halogen atom, hydroxyl group, nitro group, alkoxy group having 1 to 12 carbon atoms, alkyl group having 1 to 12 carbon atoms, and arylalkyl group having 7 to 14 carbon atoms).

Specific examples of the maleimide unit represented by the general formula (5) include a non-substituted maleimide unit, an N-methyl maleimide unit, an N-phenyl maleimide unit, an N-cyclohexyl maleimide unit, and an N-benzyl maleimide unit. These maleimide units may be contained singly or in combination of two or more of them.

For the purpose of adjusting optical properties, the maleimide acrylic-based resin may further have an aromatic vinyl unit.

The glutarimide acrylic-based resin may be an acrylic-based resin having a glutarimide ring structure. An example of the glutarimide acrylic-based resin includes a resin having a unit represented by the following general formula (1) and a unit represented by the following general formula (2).

[Chemical Formula 2]

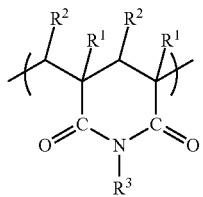

(1)

In the above general formula (1), $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or a substituent group having an aromatic ring and 5 to 15 carbon atoms. Hereinafter, the unit represented by the above general formula (1) is also referred to as "glutarimide unit".

In the above general formula (1), preferably, $R^1$ and $R^2$ are each independently hydrogen or a methyl group, $R^3$ is hydrogen, a methyl group, a butyl group, or a cyclohexyl group, and more preferably, $R^1$, $R^2$, and $R^3$ are a methyl group, hydrogen, and a methyl group, respectively.

The glutarimide acrylic-based resin may contain only one kind of glutarimide unit or may contain two or more kinds of glutarimide units in which any one of $R^1$, $R^2$, and $R^3$ in the above general formula (1) is different or all of them in the above general formula (1) are different.

The glutarimide unit can be formed by imidizing a (meth)acrylic ester unit represented by the following general formula (2). Alternatively, the glutarimide unit may be formed by imidizing an acid anhydride such as maleic anhydride, a half ester of the acid anhydride and a linear or branched alcohol having 1 to 20 carbon atoms, or α,β-ethylenic unsaturated carboxylic acid (e.g., acrylic acid, methacrylic acid, maleic acid, itaconic acid, crotonic acid, fumaric acid, or citraconic acid).

The glutarimide unit content of the glutarimide acrylic-based resin is not particularly limited, and can be appropriately determined in consideration of, for example, the structure of $R^3$. However, the glutarimide unit content is preferably 1.0% by weight or more, more preferably 3.0% by weight to 90% by weight, and still more preferably 5.0% by weight to 60% by weight with respect to the total weight of the glutarimide acrylic-based resin. If the glutarimide unit content is less than the above range, the resulting glutarimide acrylic-based resin tends to be poor in heat resistance or tends to have impaired transparency. On the other hand, if the glutarimide unit content exceeds the above range, heat resistance and melt viscosity become unnecessarily high, which tends to deteriorate mold processability, significantly decrease mechanical strength when a resulting film is processed, or impair transparency.

The glutarimide unit content is calculated by the following manner. A resin is subjected to H-NMR analysis using $^1$H-NMR BRUKER AvanceIII (400 MHz) to determine the content (mol %) of each monomer unit, such as a glutarimide unit or an ester unit, contained in the resin, and the monomer unit content (mol %) is converted to a monomer unit content (wt %) using the molecular weight of each monomer unit.

For example, when the resin is composed of a glutarimide unit whose $R^3$ in the above general formula (1) is a methyl group and a methyl methacrylate unit, the glutarimide unit content (wt %) of the resin can be determined from the following calculation formula using the area a of a peak derived from protons of O—CH$_3$ of methyl methacrylate and appearing at around 3.5 to 3.8 ppm and the area b of a peak derived from protons of N—CH$_3$ of glutarimide and appearing at around 3.0 to 3.3 ppm.

[Methyl methacrylate unit content $A$ (mol %)]= 100×$a$/($a$+$b$)

[Glutarimide unit content $B$ (mol %)]=100×$b$/($a$+$b$)

[Glutarimide unit content (wt %)]=100×($b$×(molecular weight of glutarimide unit))/($a$×(molecular weight of methyl methacrylate unit)+$b$×(molecular weight of glutarimide unit))

It is to be noted that even when the resin contains a monomer unit other than the above units, the glutarimide unit content (wt %) can be determined in a similar manner from the content (mol %) of each monomer unit contained in the resin and the molecular weight of each monomer unit.

When the acrylic-based resin film of the present invention is used, for example, for a polarizer protective film, the glutarimide unit content in the glutarimide acrylic-based resin is preferably 20% by weight or less, more preferably 15% by weight or less, and still more preferably 10% by weight or less, because birefringence is likely to be suppressed.

[Chemical Formula 3]

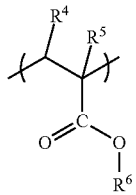
(2)

In the above general formula (2), $R^4$ and $R^5$ are each independently hydrogen or an alkyl group having 1 to 8 carbon atoms, and $R^6$ is an alkyl group having 1 to 18 carbon atoms, a cycloalkyl group having 3 to 12 carbon atoms, or a substituent group having an aromatic ring and 5 to 15 carbon atoms. Hereinafter, the unit represented by the above general formula (2) is also referred to as "(meth)acrylic ester unit". It is to be noted that in the present invention, the "(meth)acrylate" refers to "methacrylate or acrylate".

In the above general formula (2), preferably, $R^4$ and $R^5$ are each independently hydrogen or a methyl group, $R^6$ is hydrogen or a methyl group, and more preferably, $R^4$, $R^5$, and $R^6$ are hydrogen, a methyl group, and a methyl group, respectively.

The glutarimide acrylic-based resin may contain only one kind of (meth)acrylic ester unit or may contain two or more kinds of (meth)acrylic ester units in which any one of $R^4$, $R^5$, and $R^6$ in the above general formula (2) is different or all of them in the above general formula (2) are different.

If necessary, the glutarimide acrylic-based resin may further contain a unit represented by the following general formula (3) (hereinafter, also referred to as "aromatic vinyl unit").

[Chemical Formula 4]

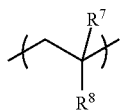
(3)

In the above general formula (3), $R^7$ is hydrogen or an alkyl group having 1 to 8 carbon atoms, and $R^8$ is an aryl group having 6 to 10 carbon atoms.

The aromatic vinyl unit represented by the above general formula (3) is not particularly limited, and examples thereof include a styrene unit and an α-methylstyrene unit. The aromatic vinyl unit is preferably a styrene unit.

The glutarimide acrylic-based resin may contain only one kind of aromatic vinyl unit and may contain two or more aromatic vinyl units in which one of $R^7$ and $R^8$ is different or both of them are different.

The aromatic vinyl unit content of the glutarimide acrylic-based resin is not particularly limited, but is preferably 0 to 50% by weight, more preferably 0 to 20% by weight, and particularly preferably 0 to 15% by weight with respect to the total weight of the glutarimide acrylic-based resin. If the aromatic vinyl unit content exceeds the above range, the glutarimide acrylic-based resin cannot have sufficient heat resistance. However, there is a case where the glutarimide acrylic-based resin contains no aromatic vinyl unit from the viewpoint of improving bending resistance and transparency, reducing fish-eyes, and improving solvent resistance or weather resistance.

If necessary, the glutarimide acrylic-based resin may further contain another unit other than the glutarimide unit, the (meth)acrylic ester unit, and the aromatic vinyl unit. Examples of the other unit include amide-based units such as acrylamide and methacrylamide, a glutaric anhydride unit, and nitrile-based units such as acrylonitrile and methacrylonitrile. These other units may be contained in the glutarimide acrylic-based resin by random copolymerization or graft copolymerization.

(Graft Copolymer)

The graft copolymer used in the present invention has excellent thermal stability, can impart excellent transparency and color tone to the acrylic-based resin film of the present invention, and can further improve the mechanical strength such as bending resistance and cracking resistance.

In the present invention, the graft copolymer is a multistage polymer and a multilayer structure polymer, called a core-shell type polymer. The multistage polymer is a polymer obtained by polymerizing a monomer mixture in the presence of polymer particles, and the multilayer structure polymer is a polymer (core-shell type polymer) having a polymer layer (shell layer) obtained by polymerizing a monomer mixture in the presence of polymer particles (core layer). Both the polymers basically indicate the same polymer, but the former is a polymer defined mainly based on its production method, and the latter is a polymer defined mainly based on its layer structure. The former will be mainly described below, but the same applies to the latter.

In the graft copolymer of the present invention, the average particle diameter of the core layer is 125 to 400 nm. Since the average particle diameter of the core layer is 125 nm or more, the strength of the acrylic-based resin film to be produced can be made excellent. Moreover, since the average particle diameter of the core layer is 400 nm or less, the acrylic-based resin film to be produced is excellent in transparency, appearance, optical properties, and the like. The average particle diameter of the core layer is preferably 130 to 380 nm, more preferably 150 to 350 nm, still more preferably 180 to 300 nm, and particularly preferably 200 to 260 nm. In the present invention, the average particle diameter of the core layer of the graft copolymer is calculated by measuring light scattering at a wavelength of 546 mm using a spectrophotometer in a state of a polymer latex of the core layer before polymerization of a shell layer.

In the present invention, as the graft copolymer, a graft copolymer is used which easily swells when dissolved and dispersed in a solvent to be used for the dope. In the present invention, a degree of swelling by methyl ethyl ketone is used as an index indicating the ease of swelling of the graft copolymer. The degree of swelling by methyl ethyl ketone indicates a ratio of the weight of methyl ethyl ketone contained in a gel polymer obtained when the graft copolymer is dissolved and dispersed in methyl ethyl ketone to the resin weight obtained by removing the weight of methyl ethyl ketone from the gel polymer. The higher the value of the degree of swelling, the more easily the graft copolymer is swollen by methyl ethyl ketone.

Specifically, the graft copolymer of the present invention has a degree of swelling by methyl ethyl ketone of 3.5 or more. The degree of swelling by methyl ethyl ketone is preferably 3.6 to 5.0. The present inventors have found that when a dope is prepared using a graft copolymer having a degree of swelling by methyl ethyl ketone of 3.5 or more together with a solvent having a hydrogen bonding term δH in a Hansen solubility parameter described later within the range of 6.0 or more and 8.0 or less, turbidity is less likely to occur in the dope. This is because when the graft copolymer is dissolved and dispersed in the solvent, the graft copolymer is easily swelled by the solvent, so that primary particles of the graft copolymer easily come loose in the dope, and as a result, it is presumed that the primary particles of the graft copolymer are uniformly dissolved and dispersed in the dope without being aggregated in the dope, and turbidity is less likely to occur in the resulting dope.

In the present invention, the degree of swelling by methyl ethyl ketone can be measured by the following procedures. After 1 g of a graft copolymer is dissolved in 40 ml of methyl ethyl ketone, the prepared solution is centrifuged to be separated into a polymer component (gel polymer) insoluble in methyl ethyl ketone and a component soluble in methyl ethyl ketone. The obtained gel polymer is dried at 60° C. and 5 torr for 10 hours to recover the dried gel polymer. From the weight of the gel polymer before drying and the weight of the gel polymer after drying, the degree of swelling by methyl ethyl ketone is calculated by the following equation:

(degree of swelling)=[(weight of gel polymer before drying)−(weight of gel polymer after drying)]/(weight of gel polymer after drying)

In order to set the degree of swelling by methyl ethyl ketone of the graft copolymer to the above range, there are a method of polymerizing the core layer in the presence of a chain transfer agent in a polymerization stage (1) described later, a method of selecting a monomer constituting a polymer that constitutes the shell layer (when the shell layer is a multilayer, a layer having the highest glass transition temperature among the multilayers) such that the glass transition temperature of the polymer is 92° C. or less (preferably 80° C. or less, more preferably 75° C. or less, still more preferably 70° C. or less, and particularly preferably 60° C. or less), and the like. Each of these methods may be used alone, but they are preferably used in combination. However, the method of setting the degree of swelling in the present invention is not limited to these methods.

According to the method of using a chain transfer agent in the polymerization of the core layer, a degree of cross-linking of the core layer is lowered by the use of the chain transfer agent, so that the core layer easily absorbs the solvent, and it is considered that the degree of swelling of the graft copolymer is improved. When a chain transfer agent is used in the polymerization of the core layer, the core layer may have a polymer terminal structure including a structure derived from the chain transfer agent. For example, when an alkyl mercaptan-based chain transfer agent is used as the chain transfer agent, the core layer will have a polymer terminal structure composed of an alkylthio group.

On the other hand, according to the method of setting the glass transition temperature of the polymer constituting the shell layer to 92° C. or lower, it is considered that bond strength between polymer molecular chains in the shell layer becomes weak, and the solvent easily passes through the shell layer, so that the graft copolymer easily absorbs the solvent. Furthermore, according to this method, it is also considered that the polymer molecular chains of the aggregated or welded shell layer are easily loosened and the graft copolymer easily absorbs the solvent. However, when the shell layer is a multilayer, the glass transition temperature of the polymer constituting a layer having the highest glass transition temperature among the multilayers should be 92° C. or lower. In order to set the glass transition temperature of the polymer constituting the shell layer to 92° C. or lower, a monomer configuration in a (i) polymerization stage or (IV) polymerization stage described later should be employed.

The swellability of the graft copolymer used in the present invention can also be represented by a swellability coefficient S. The graft copolymer used in the present invention preferably includes, in a core inner layer portion, a polymer layer mainly containing methacrylic ester and having a relatively high glass transition temperature, from the viewpoint of improving balance such as transparency and strength when the graft copolymer is made into an acrylic-based resin film through a state of the dope of the present invention. Such a graft copolymer easily has a low degree of swelling as compared with a core-shell type graft copolymer having no polymer layer having a high glass transition temperature in a core inner layer portion. Thus, the swellability coefficient S is used as a common index for expressing the swellability of the graft copolymer regardless of the presence or absence of such formulation characteristics. That is, the swelling degree coefficient S is expressed by the following equation, and the swellability coefficient S is preferably 10.5 to 18.0. The swellability coefficient S is more preferably 11.0 to 16.0, still more preferably 11.0 to 15.0, and particularly preferably 11.0 to 14.0.

Swelling degree coefficient $S$=(degree of swelling by methyl ethyl ketone/soft polymer ratio in graft copolymer)/(soft polymer ratio in core layer)

The graft copolymer of the present invention preferably has a gel fraction of 90% or less. The gel fraction is a weight ratio of a component insoluble in methyl ethyl ketone of the graft copolymer to the total amount of the graft copolymer. When the gel fraction of the graft copolymer is 90% or less, a considerable amount of a component soluble in methyl ethyl ketone is contained in the graft copolymer, and due to the soluble component, primary particles of the graft copolymer easily come loose in the dope. The gel fraction is more preferably 87% or less, still more preferably 85% or less, even more preferably 83% or less, and particularly preferably 80% or less. The lower limit of the gel fraction is not particularly limited, but if the lower limit is too low, the mechanical properties of the acrylic-based resin film such as bending resistance, cracking resistance during slitting, and cracking resistance during punching may deteriorate, so that the lower limit is preferably 65% or more, more preferably 68% or more, still more preferably 70% or more, and most preferably 73% or more.

In the present invention, the gel fraction can be measured by the following procedures. After 1 g of a graft copolymer is dissolved in 40 ml of methyl ethyl ketone, the prepared solution is centrifuged to be separated into a polymer component (gel polymer) insoluble in methyl ethyl ketone and a component soluble in methyl ethyl ketone. The obtained gel polymer is dried at 60° C. and 5 torr for 10 hours to recover the dried gel polymer. The component soluble in methyl ethyl ketone is charged into 200 ml of methanol and reprecipitated to be separated into a methanol soluble component and a component insoluble in methanol (free polymer). The drying is performed under the same conditions as described above to recover the dried free polymer and the dried methanol soluble component. From the weight of the dried gel polymer, the weight of the dried free polymer, and the weight of the dried methanol soluble component, the gel fraction (%) is calculated by the following equation.

(Gel fraction)=(weight of gel polymer after drying)/
(weight of gel polymer after drying+weight of
free polymer after drying+weight of methanol
soluble component after drying)×100

According to a preferred aspect of the present invention, the core layer in the graft copolymer has a hard polymer (I) containing, as structural units, 40 to 100% by weight of a methacrylic ester unit (a-1), 60 to 0% by weight of another monomer unit (a-2) having a double bond copolymerizable with the methacrylic ester unit, and 0.01 to 10 parts by weight of a polyfunctional monomer unit per 100 parts by weight of a total amount of the (a-1) and the (a-2), and a soft polymer (II) containing, as structural units, 60 to 100% by weight of an acrylic ester unit (b-1), 0 to 40% by weight of another monomer unit (b-2) having a double bond copolymerizable with the acrylic ester unit, and 0.1 to 5 parts by weight of a polyfunctional monomer unit per 100 parts by weight of a total amount of the (b-1) and the (b-2). The soft polymer (II) is bonded to the hard polymer (I), the shell layer includes a hard polymer (II) containing, as structural units, 60 to 100% by weight of a methacrylic ester unit (c-1), 40 to 0% by weight of another monomer unit (c-2) having a double bond copolymerizable with the methacrylic ester unit, and 0 to 10 parts by weight of a polyfunctional monomer unit per 100 parts by weight of a total amount of the (c-1) and the (c-2), and the hard polymer (III) is graft-bonded to the hard polymer (I) and/or the soft polymer (II).

According to a preferred aspect of the present invention, the graft copolymer can be obtained by multistage polymerization including at least the following polymerization stages (I) to (III). A polymer layer formed by the polymerization stages (I) to (II) corresponds to the core layer, and a polymer layer formed by the polymerization stage (III) and the subsequent stage corresponds to the shell layer.

Polymerization Stage (I)

In the polymerization stage (I), preferably, a monomer mixture (a) containing 40 to 100% by weight of the methacrylic ester (a-1) and 60 to 0% by weight of the other monomer (a-2) having a double bond copolymerizable with the methacrylic ester, and 0.01 to 10 parts by weight of the polyfunctional monomer and 0.1 to 4.0 parts by weight of a chain transfer agent per 100 parts by weight of the total amount of the (a-1) and the (a-2) are polymerized to obtain the hard polymer (I).

The other monomer having a copolymerizable double bond (hereinafter, also referred to as "copolymerizable monomer") is preferably an alkyl acrylate ester whose alkyl group has 1 to 12 carbon atoms and/or an aromatic vinyl monomer.

The monomer mixture (a) preferably contains 40 to 100% by weight of a methacrylic ester, 0 to 35% by weight of an acrylic ester, 0 to 10% by weight of an aromatic vinyl monomer, and 0 to 15% by weight of another monomer having a copolymerizable double bond, more preferably contains 40 to 99.9% by weight of a methacrylic ester, 0.1 to 35% by weight of an acrylic ester, 0 to 10% by weight of an aromatic vinyl monomer, and 0 to 15% by weight of another monomer having a copolymerizable double bond, still more preferably contains 40 to 99.8% by weight of a methacrylic ester, 0.1 to 35% by weight of an acrylic ester, 0.1 to 10% by weight of an aromatic vinyl monomer, and 0 to 15% by weight of another monomer having a copolymerizable double bond, and even more preferably contains 51 to 96.9% by weight of a methacrylic ester, 3.1 to 29% by weight of an acrylic ester, 0 to 10% by weight of an aromatic vinyl monomer, and 0 to 10% by weight of another monomer having a copolymerizable double bond. By setting the amount of each of the monomers in the monomer mixture (a) to a value within the above range, the graft copolymer of the present invention can have high thermal stability. Specifically, the methacrylic ester as a main component is likely to be thermally decomposed during high-temperature molding due to zipping depolymerization, but by setting the amount of each of the acrylic ester and the aromatic vinyl monomer to a value within the above range, the zipping depolymerization can be easily prevented and thermal stability can be improved, and thus it is preferable.

Particularly preferably, the monomer mixture (a) contains 51 to 96.8% by weight of a methacrylic ester, 3.1 to 29% by weight of an acrylic ester, 0.1 to 10% by weight of an aromatic vinyl monomer, and 0 to 10% by weight of another monomer having a copolymerizable double bond. By setting the amount of each of the monomers in the monomer mixture (a) to a value within the above range, as described above, zipping depolymerization can be prevented to improve thermal stability, and the resulting graft copolymer can be blended with the acrylic-based resin without impairing the optical properties of the acrylic-based resin such as transparency and color tone.

In the monomer mixture (a), since the proportion of the methacrylic ester is 40% by weight or more, excellent characteristics of the acrylic-based resin can be suitably achieved.

Examples of the methacrylic ester include methyl methacrylate, ethyl methacrylate, n-butyl methacrylate, isobutyl methacrylate, t-butyl methacrylate, hexyl methacrylate, cyclohexyl methacrylate, 2-ethylhexyl methacrylate, octyl methacrylate, isobornyl methacrylate, phenyl methacrylate, and benzyl methacrylate. Among them, an alkyl methacrylate ester whose alkyl group has 1 to 4 carbon atoms is preferable, and examples thereof include methyl methacrylate, ethyl methacrylate, n-butyl methacrylate, isobutyl methacrylate, and t-butyl methacrylate. Although these methacrylic esters may be used singly or in combination of two or more of them, methyl methacrylate is particularly preferable.

The other monomer having a copolymerizable double bond is preferably at least one selected from the group consisting of an acrylic ester, an aromatic vinyl-based monomer, and a copolymerizable monomer other than a (meth)acrylic ester and an aromatic vinyl monomer, and more preferably one or two or more monomers selected from the group consisting of an alkyl acrylate ester whose alkyl group has 1 to 12 carbon atoms, an aromatic vinyl-based monomer, and a copolymerizable monomer other than a (meth)acrylic ester and an aromatic vinyl monomer. Examples of the acrylic ester include an alkyl acrylate ester whose alkyl group has 1 to 12 carbon atoms, isobornyl acrylate, phenyl acrylate, and benzyl acrylate. Examples of the alkyl acrylate ester whose alkyl group has 1 to 12 carbon atoms include ethyl acrylate, n-butyl acrylate, n-octyl acrylate, 2-ethylhexyl acrylate, and cyclohexyl acrylate. Examples of the aromatic vinyl-based monomer include styrene, α-methyl styrene, chlorostyrene, and another styrene derivative. Examples of the copolymerizable monomer other than a (meth)acrylic ester and an aromatic vinyl monomer include unsaturated nitrile-based monomers such as acrylonitrile and methacrylonitrile, α,β-unsaturated carboxyl acids such as acrylic acid, methacrylic acid, and crotonic acid, vinyl acetate, olefin-based monomers such as ethylene and propylene, vinyl halide-based monomers such as vinyl chloride, vinylidene chloride, and vinylidene fluoride, and maleimide-based monomers such as N-ethyl maleimide, N-propyl maleimide, N-cyclohexyl maleimide, and N-o-chlorophenyl maleimide. These copolymerizable monomers may be used singly or in combination of two or more of them. The other monomer having a copolymerizable double bond is preferably an alkyl acrylate ester whose alkyl group has 1 to 12 carbon atoms and/or an aromatic vinyl monomer.

The amount of the polyfunctional monomer used in the polymerization stage (I) is preferably 0.01 to 10 parts by weight, more preferably 0.01 to 7 parts by weight, still more preferably 0.01 to 5 parts by weight, and most preferably 0.01 to 2 parts by weight per 100 parts by weight of the total amount of the (a-1) and the (a-2). When the amount of the polyfunctional monomer used is 0.01 parts by weight or more, the transparency of the resulting film is improved, and when the amount of the polyfunctional monomer used is 10 parts by weight or less, excellent mechanical properties can be imparted to the film.

The polyfunctional monomer to be used may be either one known as a cross-linking agent or one known as a cross-linkable monomer. As the cross-linkable monomer, allyl methacrylate, allyl acrylate, diallyl maleate, diallyl fumarate, diallyl itaconate, monoallyl maleate, monoallyl fumarate, butadiene, divinyl benzene, triallyl isocyanurate, alkylene glycol dimethacrylate, alkylene glycol diacrylate, and the like are preferable. These cross-linkable monomers may be used singly or in combination of two or more of them, and it is more preferable that allyl methacrylate is used alone, or allyl methacrylate and another polyfunctional monomer are used in combination.

In the polymerization stage (I) of the present invention, it is preferable that a mixture of the monomer mixture (a) and the polyfunctional monomer is polymerized in the presence of the chain transfer agent to obtain the hard polymer (I).

The amount of the chain transfer agent used in the polymerization stage (I) is preferably 0.1 to 4.0 parts by weight per 100 parts by weight of the total amount of the (a-1) and the (a-2). The lower limit is more preferably 0.20 parts by weight, still more preferably 0.30 parts by weight, yet more preferably 0.40 parts by weight, and particularly preferably 0.50 parts by weight. The upper limit is more preferably 3.5 parts by weight, still more preferably 3.0 parts by weight, yet more preferably 2.5 parts by weight, even more preferably 2.0 parts by weight, and particularly preferably 1.5 parts by weight. The chain transfer agent has a function of increasing the amount of a free polymer having a low molecular weight. Accordingly, when the chain transfer agent is used in a larger amount, the degree of cross-linking of the core layer is lowered, so that the core layer easily absorbs a solvent, and the degree of swelling of the graft copolymer is improved, so that the primary particles of the graft copolymer easily come loose. As a result, turbidity is less likely to occur in the dope. On the other hand, if the chain transfer agent is excessively used, there is a case where an acrylic-based resin film is hard to have adequate mechanical properties such as bending resistance, cracking resistance during slitting, and cracking resistance during punching. However, when the chain transfer agent is used within the above range, it is possible to obtain a graft copolymer in which turbidity is less likely to occur in the dope and which can impart excellent mechanical properties to the acrylic-based resin film.

The chain transfer agent to be used in the polymerization stage (I) is not particularly limited, and may be a chain transfer agent known in the relevant field. Examples of the chain transfer agent include primary alkyl mercaptan-based chain transfer agents such as n-butyl mercaptan, n-octyl mercaptan, n-hexadecyl mercaptan, n-dodecyl mercaptan, and n-tetradecyl mercaptan; secondary alkyl mercaptan-based chain transfer agents such as s-butyl mercaptan and s-dodecyl mercaptan; tertiary alkyl mercaptan-based chain transfer agents such as t-dodecyl mercaptan and t-tetradecyl mercaptan; thioglycolate esters such as 2-ethylhexyl thioglycolate, ethylene glycol dithioglycolate, trimethylolpropane tris(thioglycolate), and pentaerythritol tetrakis(thioglycolate); thiophenol; tetraethylthiuram disulfide, pentane phenyl ethane; acrolein; methacrolein; allyl alcohol; carbon tetrachloride; ethylene bromide; a styrene oligomer such as α-methylstyrene dimer; and terpinolene. These chain transfer agents may be used alone or in combination with two or more of them.

When the chain transfer agent contains a sulfur component, the thermal stability of the graft copolymer is improved. Accordingly, alkyl mercaptan-based chain transfer agents and thiophenols are preferable, and alkyl mercaptan-based chain transfer agents are more preferable. In particular, the primary alkyl mercaptan-based chain transfer agents and/or the secondary alkyl mercaptan-based chain transfer agents are preferable, and the primary alkyl mercaptan-based chain transfer agents are more preferable. In particular, n-octyl mercaptan and n-dodecyl mercaptan are preferable, and n-octyl mercaptan is particularly preferable.

In the graft copolymer of the present invention, the hard polymer (I) obtained in the polymerization stage (I) preferably has an alkylthio group derived from the alkyl mercaptan-based chain transfer agent and more preferably has a primary and/or secondary alkylthio group derived from the primary alkyl mercaptan-based chain transfer agent and/or the secondary alkyl mercaptan-based chain transfer agent. An alkylthio group refers to a structure represented by a chemical formula, RS— (R is an alkyl group), and the primary and/or secondary alkylthio group means that the R is a primary and/or secondary alkyl group.

Polymerization Stage (II)

In the polymerization stage (II), preferably, a monomer mixture (b) containing 60 to 100% by weight of an acrylic ester (b-1) and 0 to 40% by weight of another monomer (b-2) having a double bond copolymerizable with the acrylic ester, and 0.1 to 5 parts by weight of a polyfunctional monomer and 0 to 2.0 parts by weight of a chain transfer agent per 100 parts by weight of the total amount of the (b-1) and the (b-2) are polymerized to obtain a soft polymer (II).

The other monomer having a copolymerizable double bond is preferably at least one selected from the group consisting of a methacrylic ester and another monomer having a copolymerizable double bond.

The monomer mixture (b) preferably contains 60 to 100% by weight of an acrylic ester, 0 to 40% by weight of a methacrylic ester, and 0 to 20% by weight of another monomer having a copolymerizable double bond. From the viewpoint of obtaining a film excellent in transparency and color tone, the monomer mixture (b) more preferably contains 60 to 100% by weight of an acrylic ester, 0 to 10% by weight of a methacrylic ester, 0 to 40% by weight of an aromatic vinyl-based monomer, and 0 to 10% by weight of another monomer having a copolymerizable double bond.

Examples of the acrylic ester include an alkyl acrylate ester whose alkyl group has 1 to 12 carbon atoms, isobornyl acrylate, phenyl acrylate, and benzyl acrylate. Among them, an alkyl acrylate ester whose alkyl group has 1 to 12 carbon atoms is preferable. Examples of the alkyl acrylate ester include ethyl acrylate, n-butyl acrylate, n-octyl acrylate, 2-ethylhexyl acrylate, and cyclohexyl acrylate. These acrylic esters may be used singly or in combination of two or more of them. The alkyl acrylate ester is preferably n-butyl acrylate, a combination of n-butyl acrylate and ethyl acrylate, or a combination of n-butyl acrylate and 2-ethylhexyl acrylate. In particular, the n-butyl acrylate content of the acrylic ester used in the polymerization stage (II) is preferably 50 to 100% by weight, more preferably 70 to 100% by weight, and particularly preferably 80 to 100% by weight.

The methacrylic ester, the other monomer having a copolymerizable double bond, the polyfunctional monomer, and the chain transfer agent used in the polymerization stage (II) are the same as those described above with reference to the polymerization stage (I). In the polymerization stage (II), the chain transfer agent may or may not be used, but is preferably not used.

In the graft copolymer of the present invention, although the hard polymer (I) formed in the polymerization stage (I) and the soft polymer (II) formed in the polymerization stage (II) are bonded, in a specific aspect, the graft copolymer has a structure in which the soft polymer (II) covers at least a part or the whole of the particles composed of the hard polymer (I) located inside in the entire graft copolymer. A part of the soft polymer (II) may penetrate into the particles composed of the hard polymer (I). However, all the soft polymers (II) do not need to be bonded to the hard polymer (I).

Polymerization Stage (III)

In the polymerization stage (III), preferably, a monomer mixture (c) containing 60 to 100% by weight of a methacrylic ester (c-1) and 40 to 0% by weight of another monomer (c-2) having a double bond copolymerizable with the methacrylic ester, and 0 to 10 parts by weight of a polyfunctional monomer and 0 to 6 parts by weight of a chain transfer agent per 100 parts by weight of the total amount of the (c-1) and the (c-2) are polymerized to obtain a hard polymer (I).

In order to lower the glass transition temperature of the hard polymer (III) formed by the polymerization stage (I), the monomer mixture (c) preferably contains an acrylic ester. The amount of the acrylic ester used is preferably 0 to 40% by weight, more preferably 5 to 40% by weight, still more preferably 10 to 40% by weight, particularly preferably 15 to 35% by weight, and most preferably 20 to 30% by weight in the monomer mixture (c).

The graft copolymer of the present invention has a structure in which the hard polymer (III) is graft-bonded to the hard polymer (I) and/or the soft polymer (II). All the hard polymers (III) may be graft-bonded to the hard polymer (I) and/or the soft polymer (II), and while a part of the hard polymers (III) may be graft-bonded to the hard polymer (I) and/or the soft polymer (II), the remainder may exist as a polymer component (free polymer) not graft-bonded to any of the hard polymer (I) and the soft polymer (II). The polymer component not graft-bonded also constitutes a part of the graft copolymer of the present invention.

Examples of the methacrylic ester include methyl methacrylate, ethyl methacrylate, n-butyl methacrylate, isobutyl methacrylate, t-butyl methacrylate, hexyl methacrylate, cyclohexyl methacrylate, 2-ethylhexyl methacrylate, octyl methacrylate, isobornyl methacrylate, phenyl methacrylate, and benzyl methacrylate. Among them, an alkyl methacrylate ester whose alkyl group has 1 to 4 carbon atoms is preferable, and examples thereof include methyl methacrylate, ethyl methacrylate, n-butyl methacrylate, isobutyl methacrylate, and t-butyl methacrylate. Although these methacrylic esters may be used singly or in combination of two or more of them, methyl methacrylate is particularly preferable.

The other monomer having a copolymerizable double bond is preferably at least one selected from the group consisting of an acrylic ester, an aromatic vinyl-based monomer, and a copolymerizable monomer other than a (meth) acrylic ester and an aromatic vinyl monomer, and more preferably one or two or more monomers selected from the group consisting of an alkyl acrylate ester whose alkyl group has 1 to 12 carbon atoms, an aromatic vinyl monomer, and a copolymerizable monomer other than a (meth)acrylic ester and an aromatic vinyl monomer. Examples of the acrylic ester include an alkyl acrylate ester whose alkyl group has 1 to 12 carbon atoms, isobornyl acrylate, phenyl acrylate, and benzyl acrylate. Examples of the alkyl acrylate ester whose alkyl group has 1 to 12 carbon atoms include ethyl acrylate, n-butyl acrylate, n-octyl acrylate, 2-ethylhexyl acrylate, and cyclohexyl acrylate. Examples of the aromatic vinyl-based monomer include styrene, α-methyl styrene, chlorostyrene, and another styrene derivative. Examples of the copolymerizable monomer other than a (meth)acrylic ester and an aromatic vinyl-based monomer include unsaturated nitrile-based monomers such as acrylonitrile and methacrylonitrile, α,β-unsaturated carboxyl acids such as acrylic acid, methacrylic acid, and crotonic acid, vinyl acetate, olefin-based monomers such as ethylene and propylene, vinyl halide-based monomers such as vinyl chloride, vinylidene chloride, and vinylidene fluoride, and maleimide-based monomers such as N-ethyl maleimide, N-propyl maleimide, N-cyclohexyl maleimide, and N-o-chlorophenyl maleimide. These copolymerizable monomers may be used singly or in combination of two or more of them.

Examples of the polyfunctional monomer and the chain transfer agent used in the polymerization stage (III) are the same as those described in the polymerization stage (I). In the polymerization stage (III), the polyfunctional monomer may or may not be used, but is preferably not used from the viewpoint of imparting excellent mechanical properties to the film. In the polymerization stage (III), the chain transfer agent may or may not be used, but is preferably not used. The monomer mixture (c) may be identical to or different from the monomer mixture (a).

Polymerization Stage (IV)

The graft copolymer of the present invention may be provided by including a polymerization stage other than the polymerization stages (I) to (III).

As one of preferred embodiments, the graft copolymer of the present invention is provided by further performing a polymerization stage (IV) after the polymerization stages (I) to (III). Further, as one of preferred embodiments, the graft copolymer of the present invention is provided by performing a polymerization stage (IV) after the polymerization stage (II) but prior to the polymerization stage (III). In any of the embodiments, a hard polymer (IV) formed by the polymerization stage (IV) corresponds to the shell layer as with the hard polymer (III).

In the polymerization stage (IV), preferably, a monomer mixture (d) containing 40 to 100% by weight of methacrylic ester (d-1), 0 to 60% by weight of acrylic ester (d-2), and 0 to 5% by weight of another monomer (d-3) having a copolymerizable double bond, and 0 to 10 parts by weight of a polyfunctional monomer and 0 to 6 parts by weight of a chain transfer agent per 100 parts by weight of the total amount of the (d-1), the (d-2), and the (d-3) are polymerized to obtain a hard polymer (IV).

In order to lower the glass transition temperature of the hard polymer (IV) formed by the polymerization stage (IV), the amount of the acrylic ester (d-2) used is more preferably 0 to 55% by weight, still more preferably 0 to 50% by weight, even more preferably 5 to 45% by weight, still even more preferably 10 to 40% by weight, particularly preferably 15 to 40% by weight, and most preferably 20 to 40% by weight.

The methacrylic ester, the acrylic ester, the other monomer having a copolymerizable double bond, the polyfunctional monomer, and the chain transfer agent used in the polymerization stage (IV) are the same as those described above with reference to (I) to (III). In the polymerization stage (IV), the polyfunctional monomer may or may not be used, but is preferably not used from the viewpoint of imparting excellent mechanical properties to the film. In the polymerization stage (IV), the chain transfer agent may or may not be used, but is preferably not used. The monomer mixtures (a), (c) and (d) may be identical to or different from one another.

In the preferred embodiment of the graft copolymer of the present invention, the graft copolymer may have a structure in which the hard polymer (IV) is graft-bonded to the hard polymer (I) and/or the soft polymer (II) and/or the hard polymer (III). All the hard polymers (IV) may be graft-bonded to the hard polymer (I) and/or the soft polymer (II) and/or the hard polymer (III), and while a part of the hard polymers (IV) may be graft-bonded to the hard polymer (I) and/or the soft polymer (II) and/or the hard polymer (III), the remainder may exist as a polymer component not graft-bonded to any of the hard polymer (I), the soft polymer (II) and the hard polymer (III). The polymer component not graft-bonded also constitutes a part of the graft copolymer of the present invention.

In the present invention, the polymerization stage (I) is performed before the polymerization stage (II), and the polymerization stage (II) is performed before the polymerization stage (III). The graft copolymer of the present invention is preferably polymerized through the three stages (I), (II), and (III), and also preferably polymerized through the four stages (I), (II), (III), and (IV). When the multistage polymerization further includes the polymerization stage (IV), the polymerization stage (TV) may be performed prior to or after the polymerization stage (III) as long as the polymerization stage (IV) is performed after the polymerization stage (II). The multistage polymerization may further include another polymerization stage performed prior to or after any one of the polymerization stages (I) to (II) or the polymerization stages (I) to (IV).

In the present invention, a stretched film can be formed by stretching an acrylic-based polymer film formed by a solution casting method, and in this case, it is preferable to use a graft copolymer produced by performing one or more polymerization stages for forming a hard polymer before and/or after the polymerization stage (III). Particularly, more preferred is a graft copolymer obtained by four-stage polymerization including the polymerization stage (I), the polymerization stage (II), the polymerization stage (III), and the polymerization stage (IV). The polymerization stage (IV) may be performed either prior to or after the polymerization stage (III) as long as the polymerization stage (IV) is performed after the polymerization stage (II). When the polymerization stage (III) and the polymerization stage (IV) are performed, haze deterioration (whitening) as a problem of during film stretching can be prevented. At this time, although the order in which the polymerization stage (III) and the polymerization stage (IV) are performed is not limited, the polymerization stage (IV) is preferably performed after the polymerization stage (III).

The graft copolymer according to a preferred embodiment is obtained by (I) polymerizing the monomer mixture (a) containing 40 to 100% by weight of a methacrylic ester (a-1) and 60 to 0% by weight of another monomer (a-2) having a double bond copolymerizable with the methacrylic ester, 0.01 to 10 parts by weight of a polyfunctional monomer, and 0.1 to 4.0 parts by weight of a chain transfer agent per 100 parts by weight of the total amount of the (a-1) and the (a-2) to obtain a hard polymer, (II) polymerizing the monomer mixture (b) containing 60 to 100% by weight of an acrylic ester (b-1) and 0 to 40% by weight of another monomer (b-2) having a double bond copolymerizable with the acrylic ester, and 0.1 to 5 parts by weight of a polyfunctional monomer per 100 parts by weight of the total amount of the (b-1) and the (b-2) in the presence of the hard polymer to obtain a soft polymer, and (II) polymerizing the monomer mixture (c) containing 60 to 100% by weight of a methacrylic ester (c-1) and 40 to 0% by weight of another monomer (c-2) having a double bond copolymerizable with the methacrylic ester, and 0 to 10 parts by weight of a polyfunctional monomer per 100 parts by weight of the total amount of the (c-1) and the (c-2) in the presence of the soft polymer. Further, the graft copolymer may be obtained by polymerizing, in the presence of a hard polymer obtained in the polymerization in (III), the monomer mixture (d) containing 40 to 100% by weight of a methacrylic ester (d-1), 0 to 60% by weight of an acrylic ester (d-2), and 0 to 5% by weigh of another monomer (d-3) having a copolymerizable double bond, and 0 to 10 parts by weight of a polyfunctional monomer per 100 parts by weight of the total amount of the (d-1), the (d-2), and the (d-3) to obtain a hard polymer. Alternatively, the graft copolymer may be obtained by polymerizing, between the polymerization stage (II) and the polymerization stage (III), the monomer mixture (d) containing 40 to 100% by weight of a methacrylic ester (d-1), 0 to 60% by weight of an acrylic ester (d-2), and 0 to 5% by weigh of another monomer (d-3) having a copolymerizable double bond, and 0 to 10 parts by weight of a polyfunctional monomer per 100 parts by weight of the total amount of the (d-1), the (d-2), and the (d-3) to obtain a hard polymer.

Also in the polymerization stages other than the polymerization stage (I) performed to obtain the graft copolymer of the present invention, monomer polymerization may be performed in the presence of a chain transfer agent, if necessary. When the graft copolymer is produced, the total amount of the chain transfer agent used is preferably 0.01 to 6 parts by weight, more preferably 0.1 to 4 parts by weight, still more preferably 0.2 to 2 parts by weight, and particularly preferably 0.24 to 1.6 parts by weight per 100 parts by weight of the total amount of the monomer mixtures constituting the graft copolymer of the present invention.

From the viewpoint of obtaining a graft copolymer having higher thermal stability, the chain transfer agent to be used in the polymerization stages other than the polymerization stage (I) is preferably an alkyl mercaptan-based chain transfer agent and more preferably a primary alkyl mercaptan-based chain transfer agent and/or a secondary alkyl mercaptan-based chain transfer agent. The same chain transfer agent as used in the polymerization stage (I) is particularly preferably used.

The amount of the chain transfer agent used in the polymerization stage (I) is preferably more than 50% by weight and 100% by weight or less, more preferably 60% by weight or more and 100% by weight or less, still more preferably 70% by weight or more and 100% by weight or less, and particularly preferably 85% by weight or more and 100% by weight or less based on the total amount of the chain transfer agent used when the graft copolymer is produced. As one of preferred embodiments, the chain transfer agent is not used in the polymerization stages other than the polymerization stage (I).

The total amount of the monomer mixtures (a), (b) and (c) in the polymerization stages (I) to (I) is preferably 80 to 100 parts by weight, more preferably 90 to 100 parts by weight, and particularly preferably 95 to 100 parts by weight per 100 parts by weight of the total amount of the monomer mixtures constituting the graft copolymer. When the multistage polymerization further includes the polymerization stage (IV), the content of the monomer mixture (d) is preferably 0.1 to 20 parts by weight and more preferably 1 to 15 parts by weight per 100 parts by weight of the total amount of the monomer mixtures constituting the graft copolymer.

The content of the monomer mixture (b) is preferably 20 to 90 parts by weight, more preferably 40 to 90 parts by weight, and particularly preferably 45 to 85 parts by weight per 100 parts by weight of the total amount of the monomer mixtures constituting the graft copolymer.

The content of the monomer mixture (a) is preferably 0.1 to 35 parts by weight, more preferably 1 to 30 parts by weight, and particularly preferably 5 to 30 parts by weight per 100 parts by weight of the total amount of the monomer mixtures constituting the graft copolymer.

The content of the monomer mixture (c) is preferably 0.1 to 40 parts by weight, more preferably 1 to 30 parts by weight, and particularly preferably 5 to 25 parts by weight per 100 parts by weight of the total amount of the monomer mixtures constituting the graft copolymer.

In the ratio of the monomer mixtures (a) and (b), the parts-by-weight ratio between the monomer mixtures (a) and (b) is preferably 10:90 to 60:40, and more preferably 10:90 to 40:60.

In the present application, the "monomer mixtures constituting the graft copolymer" refer to monomer components constituting the graft copolymer and having a copolymerizable double bond, that is, monomer components other than the polyfunctional monomers. For example, when the graft copolymer is obtained through the polymerization stages (I) to (III), the total amount of the monomer mixtures constituting the graft copolymer refers to the total amount of the monomer mixture (a), the monomer mixture (b), and the monomer mixture (c).

The graft copolymer used in the present invention can be produced by common emulsion polymerization using a known emulsifier. Examples of the emulsifier include anion surfactants such as sodium alkyl sulfonate, sodium alkylbenzene sulfonate, sodium dioctyl sulfosuccinate, sodium lauryl sulfate, fatty acid sodium, and a phosphate ester salt such as sodium polyoxyethylene lauryl ether phosphate; and nonionic surfactants. These surfactants may be used alone or in combination with two or more of them. From the viewpoint of improving the thermal stability of the acrylic-based resin film of the present invention, in particular, polymerization is preferably performed using a phosphate ester salt (alkali metal phosphate ester salt or alkaline-earth metal phosphate ester salt) such as sodium polyoxyethylene lauryl ether phosphate.

From the viewpoint of improving the thermal stability of the acrylic-based resin film of the present invention, a polymerization initiator to be used in the multistage polymerization for obtaining the graft copolymer used in the present invention is preferably a polymerization initiator whose 10-hr half-life temperature is 100° C. or lower. The polymerization initiator is not particularly limited as long as its 10-hr half-life temperature is 100° C. or lower, but is preferably a persulfate such as potassium persulfate, sodium persulfate, or ammonium persulfate. Among these polymerization initiators, potassium persulfate is particularly preferable.

Furthermore, a technique of cleaving the polymerization initiator substantially only by a thermal decomposition mechanism to generate radicals for polymerization is preferable. Apart from this technique, as described in working example of Japanese Patent No. 3960631, a redox initiator is used in which radicals are generated by combining an oxidizing agent such as ferrous sulfate with a reducing agent such as sodium formaldehyde sulfoxylate, and simultaneously using a reagent that generates radicals at a low temperature. However, when the redox initiator is applied to the present invention, a large amount of radicals may be generated at a time. Specifically, when a polymer layer mainly containing a methacrylic ester is formed by polymerization using a redox initiator as at least in the polymerization stage (T), a large amount of radicals are generated at a time, so that a bond that is cleaved by relatively low energy, such as a head-to-head bond, may be formed in the polymer mainly containing the methacrylic ester. When the graft copolymer is exposed to high temperatures during mold processing or the like, such a bond is likely to become a starting point of zipping depolymerization, so that the thermal stability of the graft copolymer is significantly impaired, which as a result may impair the color tone of the film. For this reason, the polymerization initiator is preferably cleaved only by a thermal decomposition mechanism without using the redox initiator.

From the above viewpoint, the 10-hr half-life temperature of the polymerization initiator is preferably 100° C. or lower, more preferably 90° C. or lower, still more preferably 80° C. or lower, and particularly preferably 75° C. or lower.

The polymerization initiator is preferably used in the polymerization of the polymerization stage (I), and more preferably used in the polymerization of the polymerization stage using a chain transfer agent. It is particularly preferable that the polymerization initiator is used for polymerization in all the polymerization stages performed to obtain the graft copolymer.

The total amount of the polymerization initiator is preferably 0.01 to 1.0 parts by weight, more preferably 0.01 to 0.6 parts by weight, and particularly preferably 0.01 to 0.2 parts by weight per 100 parts by weight of the total amount of the monomer mixtures constituting the graft copolymer. When the graft copolymer is obtained through the three polymerization stages (I) to (III), the amount of the polymerization initiator used in the polymerization stage (I) is preferably 0.01 to 1.85 parts by weight, the amount of the polymerization initiator used in the polymerization stage (II) is preferably 0.01 to 0.6 parts by weight, and the amount of the polymerization initiator used in the polymerization stage (III) is preferably 0.01 to 0.90 parts by weight, and the amount of the polymerization initiator used in the polymerization stage (I) is particularly preferably 0.01 to 0.2 parts by weight, the amount of the polymerization initiator used in the polymerization stage (II) is particularly preferably 0.01 to 0.4 parts by weight, and the amount of the polymerization initiator used in the polymerization stage (111) is particularly preferably 0.01 to 0.2 parts by weight, per 100 parts by weight of the monomer mixture used in each of the polymerization stages (I) to (III). The amount of the polymerization initiator used in the polymerization stage (I) is preferably more than 1% by weight and 29% by weight or less of the total amount of the polymerization initiator used.

In the present invention, the core layer of the graft copolymer refers to a crosslinked structure polymer obtained by performing polymerization up to the polymerization stage (II) (thus, the outermost layer of the core layer is the soft polymer formed by the polymerization stage (II)), and the shell layer refers to the hard polymer obtained by performing the polymerization after the polymerization stage (II).

The thus obtained graft copolymer latex is spray-dried or added with a water-soluble electrolyte such as salt or acid to be coagulated. Then, a solid or powdery graft copolymer is obtained by a known method, for example, such that the resulting product is subjected to heat treatment, then a resin component is separated from the water phase, and then appropriately washed and dried. A particularly preferred method is to coagulate the graft copolymer latex using a salt. The salt to be used is not particularly limited, but is preferably a bivalent salt of a calcium salt such as calcium chloride or calcium acetate, or a magnesium salt such as a magnesium chloride or magnesium sulfate, and is particularly preferably a magnesium salt such as magnesium chloride or magnesium sulfate. An additive such as an antioxidant or an ultraviolet absorber usually added during coagulation may be added.

In the present invention, the graft copolymer latex is preferably filtered through a filter, a mesh, or the like before coagulation operation to remove fine polymerization scale. This makes it possible to reduce fish-eyes or foreign substances resulting from such fine polymerization scale to improve the transparency of the dope of the present invention.

In order to improve the mechanical strength of a thermoplastic acrylic-based resin or the like, a method of adding a soft polymer is known. However, in this case, there is a drawback that the soft polymer is homogeneously mixed with a matrix resin (here corresponding to the thermoplastic acrylic-based resin), so that the resulting film has low heat resistance. On the other hand, when the graft copolymer of the present invention is used which has a soft cross-linked polymer layer and a hard polymer layer covering the soft cross-linked polymer layer, the resulting film has a discontinuous sea-island structure in which the soft cross-linked polymer layer corresponds to "island" and the matrix resin and the hard polymer layer correspond to "sea". Therefore, the graft copolymer can provide an excellent effect of improving the mechanical strength and hardly reducing the heat resistance. The soft cross-linked polymer layer may have a hard cross-linked polymer layer on the inner side thereof. Further, a soft cross-linked polymer generally has composition different from that of the matrix resin, which makes it difficult to uniformly disperse the soft cross-linked polymer in the matrix resin. Therefore, the soft cross-linked polymer causes deterioration in optical properties such as transparency or defects such as fish-eyes, and further causes reduction in mechanical strength. However, in the graft copolymer of the present invention having the hard polymer layer covering the soft cross-linked polymer layer, the soft cross-linked polymer layer can be uniformly dispersed in the matrix resin.

In the present application, the term "soft" means that the glass transition temperature of the polymer is lower than 10° C. From the viewpoint of enhancing the ability of the soft layer to absorb impact and enhancing the effect of improving impact resistance such as cracking resistance, the glass transition temperature of the soft polymer is preferably lower than 0° C. and more preferably lower than −20° C.

In the present application, the term "hard" means that the glass transition temperature of the polymer is 10° C. or higher. If the glass transition temperature of the polymer (I) or (II) is lower than 10° C., the heat resistance of the acrylic-based resin film of the present invention is reduced, or a cross-linked structure-containing polymer is likely to be coarse or agglomerated during the production of the cross-linked structure-containing polymer.

The hard polymer (the polymer formed by the polymerization stage (III) or the polymerization stage (IV)) which constitutes the shell layer (when the shell layer is a multilayer, a layer having the highest glass transition temperature among the multilayers) of the graft copolymer has a glass transition temperature of preferably 10° C. or higher and 92° C. or lower. By setting the glass transition temperature of the hard polymer to 92° C. or lower, the bond strength between polymer molecular chains in the shell layer is weakened, the cohesion among the primary particles of the graft copolymer is reduced, and the primary particles of the graft copolymer easily come loose, so that turbidity is less likely to occur in the dope.

In the present application, the glass transition temperature of the "soft" or "hard" polymer is calculated by Fox equation using a value described in Polymer Hand Book (J. Brandrup, Interscience 1989) (for example, the glass transition temperature of polymethyl methacrylate is 105° C. and the glass transition temperature of polybutyl acrylate is −54° C.).

According to a preferred embodiment of the present invention, the polymer (I) obtained in the polymerization stage (I) is a hard polymer, the polymer (II) obtained in the polymerization stage (II) is a soft polymer, and the polymer (II) obtained in the polymerization stage (III) is a hard polymer. The polymer (IV) obtained in the polymerization stage (IV) is a hard polymer. The graft copolymer having such a configuration has well-balanced appearance, transparency, weather resistance, gloss, processability, thermal stability and the like when blended with various thermoplastic acrylic-based resins. Consequently, it is possible to provide a film excellent in thermal stability, weather resistance, gloss, processability, and the like without impairing excellent color tone, appearance, and transparency of the blended thermoplastic acrylic-based resin.

The blending ratio of the thermoplastic acrylic-based resin and the graft copolymer varies depending on the purpose of the film, but per 100 parts by weight of the total blending amount of the thermoplastic acrylic-based resin and the graft copolymer, the amount of the thermoplastic acrylic-based resin blended is preferably 30 to 98 parts by weight and the amount of the graft copolymer blended is preferably 70 to 2 parts by weight, the amount of the thermoplastic acrylic-based resin blended is more preferably 50 to 95 parts by weight and the amount of the graft copolymer blended is more preferably 50 to 5 parts by weight, and the amount of the thermoplastic acrylic-based resin blended is particularly preferably 60 to 90 parts by weight and the amount of the graft copolymer blended is particularly preferably 40 to 10 parts by weight. When the amount of the thermoplastic acrylic-based resin blended is 30 parts by weight or more, the properties of the thermoplastic acrylic-based resin can be sufficiently exerted, and when the amount of the thermoplastic acrylic-based resin mixed is 98 parts by weight or less, the mechanical strength of the thermoplastic acrylic-based resin can be improved sufficiently.

(Solvent)

For the dope of the present invention, as the solvent for dissolving and dispersing the thermoplastic acrylic-based resin and the graft copolymer, a solvent having a hydrogen bonding term δH in a Hansen solubility parameter of 6.0 or more and 8.0 or less is used. By preparing the dope using such a solvent, good solubility or dispersibility of the thermoplastic acrylic-based resin and the graft copolymer in the solvent can be achieved. A solvent having a hydrogen bonding term δH of 6.3 or more and 7.5 or less is preferable, and a solvent having a hydrogen bonding term H of 7.0 or more and 7.2 or less is more preferable.

Conventionally, a solubility parameter (SP value) has been known as an index indicating the solubility of a substance, and a Hansen solubility parameter has been proposed in which the cohesive energy term of the SP value is divided by the type of interaction energy (London dispersion force, dipole-dipole force, hydrogen bonding force) acting between molecules, and the terms are expressed as the London dispersion force term, the dipole-dipole force term, and the hydrogen bonding force term, respectively. In the present invention, the hydrogen bonding term δH of the Hansen solubility parameter is used as an index indicating the solubility when the thermoplastic acrylic-based resin and the graft copolymer are dissolved in the solvent. According to the study of the present inventors, it has been found that the numerical value of the hydrogen bonding term H is more correlated with the solubility of the thermoplastic acrylic-based resin and the graft copolymer in the solvent than the London dispersion force term and the dipole-dipole force term, and the hydrogen bonding term δH can serve as an index indicating the solubility. For the details of the hydrogen bonding term δH, see, for example, Hideki Yamamoto, "Special issue: Polymer compatibilization design 1. Solubility evaluation using Hansen solubility parameter (HSP value)", adhesion technology, Vol. 34, No. 3, 2014, 116th issue, pp. 1-8.

Examples of the solvent satisfying the hydrogen bonding term δH include acetone (7.0), acetonitrile (6.1), ethyl acetate (7.2), γ-butyrolactone (7.4), methylene chloride (7.1), n-butyl acetate (6.3), N-methyl-2-pyrrolidone (7.2), and tetrahydrofuran (8.0). The numbers in parentheses indicate the hydrogen bonding term δH. These solvents may be used alone or in combination of two or more of them.

Among these solvents, methylene chloride is more preferable because the rate of dissolving the thermoplastic acrylic-based resin is high and the dispersibility of the graft copolymer is good.

Further, the solvent contained in the dope of the present invention may be composed only of a solvent satisfying the requirement of the hydrogen bonding term H and may not contain any solvent not satisfying the requirement of the hydrogen bonding term δH. In consideration of improving film forming properties in the solution casting method, film releasability and handleability, and the like, a small amount of a solvent not satisfying the requirement of the hydrogen bonding term H may be contained, in addition to the solvent satisfying the requirement of the hydrogen bonding term δH. At this time, the content of the solvent not satisfying the requirement of the hydrogen bonding term δH is preferably 0% or more and less than 50% by weight, more preferably 30% by weight or less, still more preferably 10% by weight or less, and particularly preferably 5% by weight or less relative to the total weight of the solvent contained in the dope.

The proportion of the resin component (the total amount of the thermoplastic acrylic-based resin and the graft copolymer) in the dope of the present invention is not particularly limited, and can be appropriately determined in consideration of the solubility or dispersibility of the thermoplastic acrylic-based resin and the graft copolymer in the solvent used, and conditions under which the solution casting method is performed, but the proportion of the resin component is preferably 5 to 50% by weight, more preferably 10 to 45% by weight, and still more preferably 15 to 40% by weight.

(Other Components)

The dope of the present invention may appropriately contain known additives such as light stabilizers, UV absorbers, heat stabilizers, delustering agents, light diffusers, colorants, dyes, pigments, antistatic agents, heat reflecting agents, lubricants, plasticizers, UV absorbers, stabilizers, and fillers, or other resins such as styrene-based resins including acrylonitrile styrene resins and styrene-maleic anhydride resins, fluorine-based resins such as polycarbonate resins, polyvinyl acetal resins, cellulose acylate resins, polyvinylidene fluoride and polyfluoroalkyl (meth)acrylate resins, silicone-based resins, polyolefin-based resins, polyethylene terephthalate resins, and polybutylene terephthalate resins.

The dope of the present invention may appropriately contain birefringent inorganic microparticles described in Japanese Patent No. 3648201 and Japanese Patent No. 4336586, or birefringent low-molecular compounds having a molecular weight of 5000 or less, preferably 1000 or less described in Japanese Patent No. 3696649 so as to adjust orientation birefringence of a film to be formed.

(Method of Dispersing Graft Copolymer in Solvent)

The dope of the present invention contains the acrylic-based resin and the graft copolymer dissolved or dispersed in the solvent. As described above, the graft copolymer may have a structure in which primary particles having a core-shell type structure with a core layer having an average particle diameter of 125 to 400 nm are aggregated or welded to a size of several microns to several tens of millimeters. Thus, in order to produce the dope of the present invention, it is preferable to disperse the graft copolymer uniformly in the solvent, preferably in a state of coming loose to primary particles.

As such a method of dispersing the graft copolymer in the solvent, known methods can be applied widely. Examples of the methods include, but are not limited to, a method in which powder of the graft copolymer is charged into the solvent, and stirred under appropriate shearing and/or heating to be directly dispersed; a method in which the graft copolymer and the acrylic-based resin are simultaneously charged into the solvent, and stirred under appropriate shearing and/or heating to be dispersed or dissolved, thereby directly making a dope; and a method in which the acrylic-based resin and the graft copolymer are mixed in advance, preferably heated and melted, and then melted and kneaded under appropriate application of shear force to prepare a resin composition (for example, a pellet-like resin composition) in which the graft copolymer is dispersed in the acrylic-based resin, and then the resin composition is dispersed in the solvent to prepare a dope.

In the methods of dispersing the graft copolymer in the solvent, agglomerated or welded primary particles preferably come loose into the state of primary particles. Accordingly, in addition to satisfying the requirement of the graft copolymer used in the present invention, it is preferable that the graft copolymer is appropriately and effectively subjected to the action of the solvent (plasticization due to swelling), the action due to heat (plasticization), and the action of breaking by shear force primary particles aggregated or welded together. By being subjected to these actions, the graft copolymer is sufficiently well dispersed in the dope of the present invention, and when the acrylic-based resin film of the present invention is produced, adverse effects such as formation of foreign substances and fish-eyes and reduction in transparency can be avoided.

(Solution Casting Method)

The dope of the present invention is used to produce an acrylic-based resin film by a solution casting method. Specifically, the acrylic-based resin film can be produced by casting the dope of the present invention on a surface of a support and then evaporating the solvent. The resin film thus produced by the solution casting method is also referred to as a cast film.

An aspect of the solution casting method in the present invention will be described below, but is not limited thereto. First, a pellet containing the thermoplastic acrylic-based resin, the graft copolymer, and optionally the other components is prepared, and then the pellet is mixed with the solvent to make a dope in which each component is dissolved and dispersed in the solvent. Alternatively, the thermoplastic acrylic-based resin, the graft copolymer, and optionally the other components described above, are mixed simultaneously or sequentially with the solvent to make a dope in which each component is dissolved and dispersed in the solvent. Alternatively, the thermoplastic acrylic-based resin and the graft copolymer may be separately mixed in the solvent to make two or more dope preparation solutions, and the preparation solutions may be mixed to make a dope. These dissolution steps can be carried out by appropriately adjusting the temperature and the pressure. Among these methods, a method may be preferred in which a pellet containing the thermoplastic acrylic-based resin, the graft copolymer, and optionally the other components is made and then dissolved and dispersed in the solvent. After the above dissolution step, the resulting dope can be filtered or degassed.

Next, the dope is sent to a pressing die by a feed pump and cast from a slit of the pressing die onto a surface (mirror surface) of a support such as a metal or synthetic resin endless belt or drum to form a dope film.

The formed dope film is heated on the support to evaporate the solvent, and thus to form a film. The film thus obtained is peeled off from the surface of the support. Thereafter, the obtained film may be appropriately subjected to a drying step, a heating step, a stretching step and the like.

(Acrylic-Based Resin Film)

The acrylic-based resin film of the present invention is formed by the solution casting method using the dope described above. The thickness of the film is not particularly limited, but is preferably 500 μm or less, more preferably 300 μm or less, and particularly preferably 200 μm or less. The thickness is preferably 10 μm or more, more preferably 30 μm or more, still more preferably 50 μm or more, and particularly preferably 60 μm or more. When the thickness of the film is within the above range, there is an advantage that, when vacuum molding is performed using the film, deformation is less likely to occur and a deep-drawn portion is less likely to be broken, and further the film having uniform optical properties and excellent transparency can be produced. On the other hand, when the thickness of the film exceeds the above range, there is a tendency that cooling of the film after molding becomes uneven and the optical properties become uneven. When the thickness of the film is less than the above range, handling of the film may become difficult.

When measured at a film thickness of 80 μm, the acrylic-based resin film of the present invention preferably has a total light transmittance of 85% or more, more preferably 88% or more, and still more preferably 90% or more. When the total light transmittance is in the above range, the transparency is high, so that the film can be suitably used for optical members requiring light transmittance, decorative purposes, interior purposes, and vacuum molding purposes.

The acrylic-based resin film of the present invention preferably has a glass transition temperature of 90° C. or higher, more preferably 100° C. or higher, still more preferably 110° C. or higher, yet more preferably 115° C. or higher, particularly preferably 120° C. or higher, and most preferably 124° C. or higher. When the glass transition temperature is in the above range, an acrylic-based resin film excellent in heat resistance can be obtained.

When measured at a film thickness of 80 μm, the acrylic-based resin film of the present invention preferably has a haze of 2.0% or less, more preferably 1.5% or less, still more preferably 1.3% or less, and particularly preferably 1.0% or less. The film preferably has an internal haze of 1.5% or less, more preferably 1.0% or less, still more preferably 0.5% or less, and particularly preferably 0.3% or less. When the haze and the internal haze are in the above ranges, transparency is high, so that the film is suitable for optical members requiring light transmittance, decorative purposes, interior purposes, and vacuum molding purposes. The haze includes the haze of the inside of the film and the surface of the film (outside), and each is expressed as an internal haze and an external haze.

The acrylic-based resin film of the present invention can also be used as an optical film. Particularly when the acrylic-based resin film is used as a polarizer protective film, an optical anisotropy is preferably small. In particular, it is preferable that not only the optical anisotropy in an in-plane direction (length direction, width direction) of the film but also the optical anisotropy in the thickness direction is small. That is, it is preferable that both an absolute value of an in-plane retardation and an absolute value of a thickness-direction retardation are small. More specifically, the absolute value of the in-plane retardation is preferably 10 nm or less, more preferably 6 nm or less, still more preferably 5 nm or less, and particularly preferably 3 nm or less. The absolute value of the thickness-direction retardation is preferably 50 nm or less, more preferably 20 nm or less, still more preferably 15 nm or less, yet more preferably 10 nm or less, and most preferably 5 nm or less. A film having such a retardation can be suitably used as a polarizer protective film provided in a polarizing plate of a liquid crystal display device. On the other hand, if the absolute value of the in-plane retardation of the film exceeds 10 nm or the absolute value of the thickness-direction retardation exceeds 50 nm, problems such as a decrease in contrast may occur in the liquid crystal display device in the case where the film is used as a polarizer protective film provided in a polarizing plate of a liquid crystal display device.

A retardation is an indicator value calculated based on birefringence, and an in-plane retardation (Re) and a thickness-direction retardation (Rth) can be calculated by the following formulas, respectively. In the case of an ideal film that is completely optically isotropic in three-dimensional directions, its in-plane retardation Re and thickness-direction retardation Rth are both 0.

$$Re=(nx-ny) \times d$$

$$Rth=((nx+ny)/2-nz) \times d$$

In the above formulas, nx, ny, and nz represent refractive indexes in X, Y, and Z axis directions, respectively, when an in-plane extension direction (orientation direction of polymer chains) is defined as an X axis, a direction orthogonal to the X axis is defined as a Y axis, and the thickness direction of a film is defined as a Z axis. Further, d represents the thickness of the film, and nx−ny represents orientation birefringence. Although the MD direction of the film corresponds to the X axis, in the case of a stretched film, the stretching direction corresponds to the X axis.

In the acrylic-based resin film of the present invention, the value of the orientation birefringence is preferably $-2.6 \times 10^{-4}$ to $2.6 \times 10^{-4}$, more preferably $-2.1 \times 10^{-4}$ to $2.1 \times 10^{-4}$, still more preferably $-1.7 \times 10^{-4}$ to $1.7 \times 10^{-4}$, even more preferably $-1.6 \times 10^{-4}$ to $1.6 \times 10^{-4}$, still even more preferably $-1.5 \times 10^{-4}$ to $1.5 \times 10^{-4}$, yet still even more preferably $-1.0 \times 10^{-4}$ to $1.0 \times 10^{-4}$, particularly preferably $-0.5 \times 10^{-4}$ to $0.5 \times 10^{-4}$, and most preferably $-0.2 \times 10^{-4}$ to $0.2 \times 10^{-4}$. When the orientation birefringence is within the above range, birefringence does not occur during mold processing, and stable optical properties can be achieved. Further, the acrylic-based resin film is very suitable also as an optical film for use in a liquid crystal display or the like.

(Stretching)

The acrylic-based resin film of the present invention has high toughness and high flexibility even as an unstretched film. However, the acrylic-based resin film may further be stretched to improve the mechanical strength and film thickness accuracy of the acrylic-based resin film.

When the acrylic-based resin film of the present invention is stretched, an unstretched film is temporarily molded from the dope of the present invention. Then, uniaxial stretching or biaxial stretching is performed, or appropriate stretching operation is performed during film molding together with progress of film formation process and a process of degassing the solvent, whereby a stretched film (uniaxially-stretched film or biaxially-stretched film) can be produced. Stretching during film molding and stretching after film molding may be combined as appropriate.

The stretching ratio of the stretched film is not particularly limited, and should be determined according to the mechanical strength, surface properties, and thickness accuracy of a stretched film to be produced. Depending on the stretching temperature, the stretching ratio is generally selected preferably in the range of 1.1 times to 5 times, more preferably in the range of 1.3 times to 4 times, and still more preferably in the range of 1.5 times to 3 times. When the stretching ratio is within the above range, the mechanical properties of the film, such as elongation rate, tear propagation strength, and resistance to flexural fatigue can be significantly improved.

(Purposes)

If necessary, the surface gloss of the acrylic-based resin film of the present invention can be reduced by a known method. An example of the method includes a method of adding an inorganic filler or cross-linkable polymer particles. Alternatively, the resulting film may be embossed to form a surface concavoconvex layer such as a prism shape, pattern, design, and knurling and to reduce surface gloss of the film.

If necessary, the acrylic-based resin film of the present invention can be used by laminating another film thereon with use of a dry laminating method using a pressure sensitive adhesive, an adhesive or the like and/or a thermal laminating method, or by forming, on the front or rear surface of the film, a functional layer such as a hard coat layer, an antireflective layer, an antifouling layer, an antistatic layer, a printing decoration layer, a metallic gloss layer, a surface concavoconvex layer, or a matting layer.

The acrylic-based resin film of the present invention can be used in various purposes by using properties such as heat resistance, transparency, and flexibility. For example, the acrylic-based resin film of the present invention can be used for interior and exterior of cars, personal computers, mobile devices, and solar batteries; solar battery backsheets; taking lenses for cameras, VTRs, and projectors; finders, filters, prisms, Fresnel lenses, lens covers and the like for use in the field of imaging; lenses such as pick-up lenses for optical disc in CD players, DVD players, MD players, and the like for use in the field of lens; optical discs such as CDs, DVDs, and MDs for use in the field of optical recording; films for liquid crystal displays such as films for organic EL devices, light guide plates for liquid crystal displays, diffuser plates, backsheets, reflection sheets, polarizer protective films, polarizing films, transparent resin sheets, phase difference films, light diffusing films, prism sheets, and the like and surface protective films for use in the field of information devices; optical fibers, optical switches, optical connectors, and the like for use in the field of optical communications; car headlights, tail lamp lenses, inner lenses, instrument covers, sunroofs, and the like for use in the field of vehicles; medical devices such as eyeglasses, contact lenses, lenses for endoscopes, and medical supplies requiring sterilization for use in the medical field; road signs, bathroom fitments, floor materials, translucent panels for roads, lenses for double glazing, lighting windows, carports, lenses for lighting, lighting covers, sidings for construction materials, and the like for use in the fields of architecture and construction materials; microwave cooking vessels (dishes); housings for home appliances; toys; sunglasses; and stationary, etc. The acrylic-based resin film of the present invention can be used also as a substitute for a molded article using a transfer foil sheet.

The acrylic-based resin film of the present invention can be used by being stuck on a substrate such as metal or plastic. Examples of a method of stacking the acrylic-based resin film include lamination molding, wet lamination in which an adhesive is applied onto a metal plate such as a steel plate and then the film is laminated on and bonded to the metal plate by drying, dry lamination, extrusion lamination, and hot-melt lamination.

Examples of a method for laminating the film on a plastic part include insertion molding or laminate injection press molding in which a resin is injected into a mold in which a film is provided and in-mold molding in which a resin is injected into a mold in which a pre-molded film is provided.

A laminate of the acrylic-based resin film of the present invention can be used for alternatives to painting such as interior or exterior materials for cars, materials for civil engineering and construction such as window frames, bathroom fitments, wallpapers, floor materials, dimming/lighting members, soundproof walls, and traffic signs, daily goods, housings for furniture and electric devices, housings for OA equipment such as facsimiles, notebook computers, and copy machines, front panels for liquid crystal displays in terminals such as mobile phones, smartphones, and tablets, optical members such as lighting lenses, car headlights, optical lenses, optical fibers, optical discs, and light guide plates for liquid crystal displays, optical elements, parts of electric or electronic devices, medical supplies requiring sterilization, toys, recreational goods, and fiber-reinforced resin composite materials.

Particularly, the acrylic-based resin film of the present invention excellent in heat resistance and optical properties is suitable as an optical film, and therefore can be used for various optical members. For example, the acrylic-based resin film of the present invention can be used for known optical purposes such as front panels for liquid crystal displays in terminals such as mobile phones, smartphones and tablets, lighting lenses, car headlights, optical lenses, optical fibers, optical discs, liquid crystal display peripherals such as light guide plates for liquid crystal displays, diffuser plates, backsheets, reflection sheets, polarizing film transparent resin sheets, phase difference films, optical diffusion films, prism sheets, surface protective films, optical isotropic films, polarizer protective films, and transparent conductive films, organic EL device peripherals, and optical communication fields.

EXAMPLES

Hereinbelow, the present invention will be described more specifically with reference to examples, but is not limited to these examples. The terms "part(s)" and "%" as used hereinafter refer to "part(s) by weight" and "% by weight", respectively, unless otherwise specified.

Production Example 1

<Production of Graft Copolymer (B1)>

The following substances were fed into a polymerization apparatus having a capacity of 8 liters and equipped with a stirrer.

| | |
|---|---|
| Deionized water | 180 parts |
| Polyoxyethylene lauryl ether phosphoric acid | 0.002 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then the materials (1) shown in Table 1 were continuously added over 81 minutes. Further, polymerization was continued for 60 minutes to obtain a polymer (I). The polymerization conversion ratio was 98.6%.

Then, 0.03 parts of sodium hydroxide was added as a 2% aqueous solution, and 0.08 parts of potassium persulfate was added as a 2% aqueous solution. Then, the materials (II) shown in Table 1 were continuously added over 150 minutes. After the completion of the addition, 0.02 parts of pure potassium persulfate was added as a 2% aqueous solution, and polymerization was continued for 120 minutes to obtain a polymer (II). The polymerization conversion ratio was 99.3%, and the average particle diameter was 257 nm.

Then, 0.02 parts of potassium persulfate was added as a 2% aqueous solution. Then, the materials (IT) shown in Table 1 were continuously added over 70 minutes, and polymerization was further continued for 60 minutes to obtain a graft copolymer latex. The polymerization conversion ratio was 99.7%. The obtained latex was coagulated by salting out using magnesium chloride, washed with water, and dried to obtain a white powdery graft copolymer (B1). The gel fraction of the graft copolymer (B1) was 79.4%.

Production Example 2

<Production of Graft Copolymer (B2)>

The following substances were fed into a polymerization apparatus having a capacity of 8 liters and equipped with a stirrer.

| | |
|---|---|
| Deionized water | 175 parts |
| Polyoxyethylene lauryl ether phosphoric acid | 0.01 parts |
| Boric acid | 0.5 parts |
| Sodium carbonate | 0.05 parts |

Air in the polymerization apparatus was sufficiently purged with nitrogen gas, and then the temperature in the polymerization apparatus was set to 80° C. Then, 26% of the materials (I) shown in Table 1 were added to the polymerization apparatus at a time. Then, 0.06 parts of sodium formaldehyde sulfoxylate, 0.006 parts of disodium ethylenediamine tetraacetate, 0.001 parts of ferrous sulfate, and 0.02 parts of t-butyl hydroperoxide were added. After 15 minutes, 0.03 parts of t-butyl hydroperoxide was added, and polymerization was further continued for 15 minutes. Then, 0.01 parts of sodium hydroxide was added as a 2% aqueous solution, 0.09 parts of polyoxyethylene lauryl ether phosphoric acid was added, and the remaining 74% of (I) was continuously added over 60 minutes. After 30 minutes from the completion of the addition, 0.07 parts of t-butyl hydroperoxide was added, and polymerization was further continued for 30 minutes to obtain a polymer (I). The polymerization conversion ratio was 100.0%.

Then, 0.03 parts of sodium hydroxide was added as a 2% aqueous solution, and 0.08 parts of potassium persulfate was added as a 2% aqueous solution. Then, the materials (II) shown in Table 1 were continuously added over 150 minutes. After the completion of the addition, 0.02 parts of potassium persulfate was added as a 2% aqueous solution, and polymerization was continued for 120 minutes to obtain a polymer (II). The polymerization conversion ratio was 99.0%, and the average particle diameter was 225 nm.

Then, 0.02 parts of potassium persulfate was added as a 2% aqueous solution. Then, the materials (III-1) shown in Table 1 were continuously added over 45 minutes, and polymerization was further continued for 30 minutes.

Then, the materials (III-2) shown in Table 1 were continuously added over 25 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B2). The gel fraction of the graft copolymer (B2) was 93.7%.

Production Example 3

<Production of Graft Copolymer (B3)>

The following substances were fed into a polymerization apparatus having a capacity of 8 liters and equipped with a stirrer.

| | |
|---|---|
| Deionized water | 180 parts |
| Polyoxyethylene lauryl ether phosphoric acid | 0.03 parts |
| Boric acid | 0.5 parts |
| Sodium carbonate | 0.05 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then the materials (I) shown in Table 1 except for polyoxyethylene lauryl ether phosphoric acid were continuously added over 24 minutes. At 15 minutes later from the start of the addition of the materials (I), 0.21 parts of polyoxyethylene lauryl ether phosphoric acid was added, and at 20 minutes later, 0.003 parts of sodium hydroxide was added as a 2% aqueous solution. Further, polymerization was continued for 60 minutes to obtain a polymer (I). The polymerization conversion ratio was 95.6%.

Then, 0.02 parts of sodium hydroxide was added as a 2% aqueous solution, and 0.09 parts of potassium persulfate was added as a 2% aqueous solution. Then, the materials (II) shown in Table 1 were continuously added over 208 minutes. At 60 minutes later and 106 minutes later from the start of the addition of the materials (II), 0.01 parts of sodium hydroxide was added as a 2% aqueous solution. After the completion of the addition of the materials (II), 0.01 parts of sodium hydroxide was added as a 2% aqueous solution, 0.02 parts of potassium persulfate was added as a 2% aqueous solution, and polymerization was continued for 120 minutes to obtain a polymer (II). The polymerization conversion ratio was 100.0%, and the average particle diameter was 125 nm.

Then, 0.02 parts of potassium persulfate was added as a 2% aqueous solution. Then, the materials (III) shown in Table 1 were continuously added over 70 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B3). The gel fraction of the graft copolymer (B3) was 85.9%.

Production Example 4

<Production of Graft Copolymer (B4)>
The following substances were fed into a polymerization apparatus having a capacity of 8 liters and equipped with a stirrer.

| | |
|---|---|
| Deionized water | 180 parts |
| Polyoxyethylene lauryl ether phosphoric acid | 0.003 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then the materials (I) shown in Table 1 were continuously added over 81 minutes. Further, polymerization was continued for 60 minutes to obtain a polymer (I). The polymerization conversion ratio was 98.9%.

Then, 0.03 parts of sodium hydroxide was added as a 2% aqueous solution, and 0.08 parts of potassium persulfate was added as a 2% aqueous solution. Then, the materials (II) shown in Table 1 were continuously added over 150 minutes. After the completion of the addition, 0.02 parts of pure potassium persulfate was added as a 2% aqueous solution, and polymerization was continued for 120 minutes to obtain a polymer (II). The polymerization conversion ratio was 98.8%, and the average particle diameter was 224 nm.

Then, 0.02 parts of potassium persulfate was added as a 2% aqueous solution. Then, the materials (III) shown in Table 1 were continuously added over 70 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B4). The gel fraction of the graft copolymer (B4) was 79.0%.

Production Example 5

<Production of Graft Copolymer (B5)>
The following substances were fed into a polymerization apparatus having a capacity of 8 liters and equipped with a stirrer.

| | |
|---|---|
| Deionized water | 180 parts |
| Polyoxyethylene lauryl ether phosphoric acid | 0.003 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then the materials (I) shown in Table 1 were continuously added over 81 minutes. Further, polymerization was continued for 60 minutes to obtain a polymer (I). The polymerization conversion ratio was 100.0%.

Then, 0.03 parts of sodium hydroxide was added as a 2% aqueous solution, and 0.08 parts of potassium persulfate was added as a 2% aqueous solution. Then, the materials (II) shown in Table 1 were continuously added over 150 minutes. After the completion of the addition, 0.02 parts of pure potassium persulfate was added as a 2% aqueous solution, and polymerization was continued for 120 minutes to obtain a polymer (II). The polymerization conversion ratio was 99.0%, and the average particle diameter was 229 nm.

Then, 0.02 parts of potassium persulfate was added as a 2% aqueous solution. Then, the materials (III) shown in Table 1 were continuously added over 70 minutes, and polymerization was further continued for 60 minutes to obtain a graft copolymer latex. The polymerization conversion ratio was 99.7%. The obtained latex was coagulated by salting out using magnesium chloride, washed with water, and dried to obtain a white powdery graft copolymer (B5). The gel fraction of the graft copolymer (B5) was 79.9%.

Production Example 6

<Production of Graft Copolymer (B6)>
The following substances were fed into a polymerization apparatus having a capacity of 8 liters and equipped with a stirrer.

| | |
|---|---|
| Deionized water | 180 parts |
| Polyoxyethylene lauryl ether phosphoric acid | 0.003 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then the materials (I) shown in Table 1 were continuously added over 81 minutes. Further, polymerization was continued for 60 minutes to obtain a polymer (I). The polymerization conversion ratio was 99.2%.

Then, 0.03 parts of sodium hydroxide was added as a 2% aqueous solution, and 0.08 parts of potassium persulfate was added as a 2% aqueous solution. Then, the materials (II) shown in Table 1 were continuously added over 150 minutes. After the completion of the addition, 0.02 parts of pure potassium persulfate was added as a 2% aqueous solution, and polymerization was continued for 120 minutes to obtain a polymer (II). The polymerization conversion ratio was 98.3%, and the average particle diameter was 230 nm.

Then, 0.02 parts of potassium persulfate was added as a 2% aqueous solution. Then, the materials (III) shown in Table 1 were continuously added over 70 minutes, and polymerization was further continued for 60 minutes to obtain a graft copolymer latex. The polymerization conversion ratio was 99.6%. The obtained latex was coagulated by salting out using magnesium chloride, washed with water, and dried to obtain a white powdery graft copolymer (B6). The gel fraction of the graft copolymer (B6) was 79.7%.

Production Example 7

<Production of Graft Copolymer (B7)>

The following substances were fed into a polymerization apparatus having a capacity of 8 liters and equipped with a stirrer.

| | |
|---|---|
| Deionized water | 180 parts |
| Polyoxyethylene lauryl ether phosphoric acid | 0.003 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then the materials (I) shown in Table 1 were continuously added over 81 minutes. Further, polymerization was continued for 60 minutes to obtain a polymer (I). The polymerization conversion ratio was 98.5%.

Then, 0.03 parts of sodium hydroxide was added as a 2% aqueous solution, and 0.08 parts of potassium persulfate was added as a 2% aqueous solution. Then, the materials (II) shown in Table 1 were continuously added over 150 minutes. After the completion of the addition, 0.02 parts of pure potassium persulfate was added as a 2% aqueous solution, and polymerization was continued for 120 minutes to obtain a polymer (II). The polymerization conversion ratio was 98.4%, and the average particle diameter was 226 nm.

Then, 0.02 parts of potassium persulfate was added as a 2% aqueous solution. Then, the materials (III) shown in Table 1 were continuously added over 70 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B7). The gel fraction of the graft copolymer (B7) was 79.2%.

Production Example 8

<Production of Graft Copolymer (B8)>

The following substances were fed into a polymerization apparatus having a capacity of 8 liters and equipped with a stirrer.

| | |
|---|---|
| Deionized water | 180 parts |
| Polyoxyethylene lauryl ether phosphoric acid | 0.003 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then the materials (I) shown in Table 2 were continuously added over 81 minutes. Further, polymerization was continued for 60 minutes to obtain a polymer (I). The polymerization conversion ratio was 98.7%.

Then, 0.03 parts of sodium hydroxide was added as a 2% aqueous solution, and 0.08 parts of potassium persulfate was added as a 2% aqueous solution. Then, the materials (II) shown in Table 2 were continuously added over 150 minutes. After the completion of the addition, 0.02 parts of pure potassium persulfate was added as a 2% aqueous solution, and polymerization was continued for 120 minutes to obtain a polymer (II). The polymerization conversion ratio was 98.4%, and the average particle diameter was 225 nm.

Then, 0.02 parts of potassium persulfate was added as a 2% aqueous solution. Then, the materials (III) shown in Table 2 were continuously added over 70 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B8). The gel fraction of the graft copolymer (B8) was 79.4%.

Production Example 9

<Production of Graft Copolymer (B9)>

The following substances were fed into a polymerization apparatus having a capacity of 8 liters and equipped with a stirrer.

| | |
|---|---|
| Deionized water | 180 parts |
| Polyoxyethylene lauryl ether phosphoric acid | 0.003 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then the materials (1) shown in Table 2 were continuously added over 81 minutes. Further, polymerization was continued for 60 minutes to obtain a polymer (I). The polymerization conversion ratio was 99.6%.

Then, 0.03 parts of sodium hydroxide was added as a 2% aqueous solution, and 0.08 parts of potassium persulfate was added as a 2% aqueous solution. Then, the materials (II) shown in Table 2 were continuously added over 150 minutes. After the completion of the addition, 0.02 parts of pure potassium persulfate was added as a 2% aqueous solution, and polymerization was continued for 120 minutes to obtain a polymer (II). The polymerization conversion ratio was 98.6%, and the average particle diameter was 233 nm.

Then, 0.02 parts of potassium persulfate was added as a 2% aqueous solution. Then, the materials (III) shown in Table 2 were continuously added over 70 minutes, and polymerization was further continued for 60 minutes to obtain a graft copolymer latex. The polymerization conversion ratio was 99.3%. The obtained latex was coagulated by salting out using magnesium chloride, washed with water, and dried to obtain a white powdery graft copolymer (B9). The gel fraction of the graft copolymer (B9) was 73.8%.

Production Example 10

<Production of Graft Copolymer (B10)>
The following substances were fed into a polymerization apparatus having a capacity of 8 liters and equipped with a stirrer.

| | |
|---|---:|
| Deionized water | 180 parts |
| Polyoxyethylene lauryl ether phosphoric acid | 0.003 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then the materials (I) shown in Table 2 were continuously added over 81 minutes. Further, polymerization was continued for 60 minutes to obtain a polymer (I). The polymerization conversion ratio was 99.0%.

Then, 0.03 parts of sodium hydroxide was added as a 2% aqueous solution, and 0.08 parts of potassium persulfate was added as a 2% aqueous solution. Then, the materials (II) shown in Table 2 were continuously added over 150 minutes. After the completion of the addition, 0.02 parts of pure potassium persulfate was added as a 2% aqueous solution, and polymerization was continued for 120 minutes to obtain a polymer (II). The polymerization conversion ratio was 98.8%, and the average particle diameter was 234 nm.

Then, 0.02 parts of potassium persulfate was added as a 2% aqueous solution. Then, the materials (III) shown in Table 2 were continuously added over 70 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B10). The gel fraction of the graft copolymer (B10) was 75.2%.

Production Example 11

<Production of Graft Copolymer (B11)>
The following substances were fed into a polymerization apparatus having a capacity of 8 liters and equipped with a stirrer.

| | |
|---|---:|
| Deionized water | 180 parts |
| Polyoxyethylene lauryl ether phosphoric acid | 0.003 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then the materials (1) shown in Table 2 were continuously added over 81 minutes. Further, polymerization was continued for 60 minutes to obtain a polymer (I). The polymerization conversion ratio was 99.0%.

Then, 0.03 parts of sodium hydroxide was added as a 2% aqueous solution, and 0.08 parts of potassium persulfate was added as a 2% aqueous solution. Then, the materials (II) shown in Table 2 were continuously added over 150 minutes. After the completion of the addition, 0.02 parts of pure potassium persulfate was added as a 2% aqueous solution, and polymerization was continued for 120 minutes to obtain a polymer (II). The polymerization conversion ratio was 99.2%, and the average particle diameter was 215 nm.

Then, 0.02 parts of potassium persulfate was added as a 2% aqueous solution. Then, the materials (III) shown in Table 2 were continuously added over 70 minutes, and polymerization was further continued for 60 minutes to obtain a graft copolymer latex. The polymerization conversion ratio was 99.5%. The obtained latex was coagulated by salting out using magnesium chloride, washed with water, and dried to obtain a white powdery graft copolymer (B11). The gel fraction of the graft copolymer (B11) was 88.2%.

Production Example 12

<Production of Graft Copolymer (B12)>
The following substances were fed into a polymerization apparatus having a capacity of 8 liters and equipped with a stirrer.

| | |
|---|---:|
| Deionized water | 180 parts |
| Polyoxyethylene lauryl ether phosphoric acid | 0.003 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then the materials (I) shown in Table 2 were continuously added over 81 minutes. Further, polymerization was continued for 60 minutes to obtain a polymer (I). The polymerization conversion ratio was 99.3%.

Then, 0.03 parts of sodium hydroxide was added as a 2% aqueous solution, and 0.08 parts of potassium persulfate was added as a 2% aqueous solution. Then, the materials (II) shown in Table 2 were continuously added over 150 minutes. After the completion of the addition, 0.02 parts of pure potassium persulfate was added as a 2% aqueous solution, and polymerization was continued for 120 minutes to obtain a polymer (II). The polymerization conversion ratio was 99.0%, and the average particle diameter was 196 nm.

Then, 0.02 parts of potassium persulfate was added as a 2% aqueous solution. Then, the materials (III) shown in Table 2 were continuously added over 70 minutes, and polymerization was further continued for 60 minutes to obtain a graft copolymer latex. The polymerization conversion ratio was 99.7%. The obtained latex was coagulated by salting out using magnesium chloride, washed with water, and dried to obtain a white powdery graft copolymer (B12). The gel fraction of the graft copolymer (B12) was 97.6%.

Production Example 13

<Production of Graft Copolymer (B13)>
The following substances were fed into a polymerization apparatus having a capacity of 8 liters and equipped with a stirrer.

| Deionized water | 180 parts |
| Polyoxyethylene lauryl ether phosphoric acid | 0.003 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then the materials (I) shown in Table 2 were continuously added over 81 minutes. Further, polymerization was continued for 60 minutes to obtain a polymer (I). The polymerization conversion ratio was 98.6%.

Then, 0.03 parts of sodium hydroxide was added as a 2% aqueous solution, and 0.08 parts of potassium persulfate was added as a 2% aqueous solution. Then, the materials (II) shown in Table 2 were continuously added over 150 minutes. After the completion of the addition, 0.02 parts of pure potassium persulfate was added as a 2% aqueous solution, and polymerization was continued for 120 minutes to obtain a polymer (II). The polymerization conversion ratio was 99.3%, and the average particle diameter was 220 nm.

Then, 0.02 parts of potassium persulfate was added as a 2% aqueous solution. Then, the materials (III) shown in Table 2 were continuously added over 70 minutes, and polymerization was further continued for 60 minutes to obtain a graft copolymer latex. The polymerization conversion ratio was 99.7%. The obtained latex was coagulated by salting out using magnesium chloride, washed with water, and dried to obtain a white powdery graft copolymer (B13). The gel fraction of the graft copolymer (B13) was 79.4%.

TABLE 1

| | | Production Example 1 | Production Example 2 | Production Example 3 | Production Example 4 | Production Example 5 | Production Example 6 | Production Example 7 |
|---|---|---|---|---|---|---|---|---|
| Graft copolymer (B) | | B1 | B2 | B3 | B4 | B5 | B6 | B7 |
| Polymerization stage (I) | Monomer mixture (a) per 100 parts of total monomers of (B) (part(s)) | 27 | 27 | 8 | 27 | 27 | 27 | 27 |
| | Methyl methacrylate (%) | 93.2 | 97 | 93.2 | 93.2 | 93.2 | 93.2 | 93.2 |
| | Butyl acrylate (%) | 6 | 3 | 6 | 6 | 6 | 6 | 6 |
| | Styrene (%) | 0.8 | 0 | 0.8 | 0.8 | 0.8 | 0.8 | 0.8 |
| | Allyl methacrylate per 100 parts of total monomers of (B) (part(s)) | 0.135 | 0.135 | 0.04 | 0.135 | 0.135 | 0.135 | 0.135 |
| | n-OM per 100 parts of total monomers of (B) (part(s)) | 0.3 | 0 | 0.089 | 0.3 | 0.3 | 0.3 | 0.3 |
| | t-DM per 100 parts of total monomers of (B) (part(s)) | 0 | 0.1 | 0 | 0 | 0 | 0 | 0 |
| | Emulsifier per 100 parts of total monomers of (B) (part(s)) | 0.09 | 0.09 | 0.21 | 0.09 | 0.09 | 0.09 | 0.09 |
| Polymerization stage (II) | Monomer mixture (b) per 100 parts of total monomers of (B) (part(s)) | 50 | 50 | 69 | 50 | 50 | 50 | 50 |
| | Methyl methacrylate (%) | 0 | 0 | 0 | 0 | 0 | 0 | 0 |
| | Butyl acrylate (%) | 82 | 82 | 80.8 | 82 | 82 | 82 | 82 |
| | Styrene (%) | 18 | 18 | 19.2 | 18 | 18 | 18 | 18 |
| | Allyl methacrylate per 100 parts of total monomers of (B) (part(s)) | 0.75 | 0.75 | 0.345 | 0.75 | 0.75 | 0.75 | 0.75 |
| | PEG#600DA per 100 parts of total monomers of (B) (part(s)) | 0 | 0 | 1.69 | 0 | 0 | 0 | 0 |
| | Emulsifier per 100 parts of total monomers of (B) (part(s)) | 0.2 | 0.2 | 0.3 | 0.2 | 0.2 | 0.2 | 0.2 |
| Average particle diameter (nm) at the time of completion of polymerization stage (II) | | 257 | 225 | 125 | 224 | 229 | 230 | 226 |
| Polymerization stage (III) (III-1) | Monomer mixture (c) per 100 parts of total monomers of (B) (part(s)) | 23 | 15 | 23 | 23 | 23 | 23 | 23 |
| | Methyl methacrylate (%) | 80 | 95 | 95 | 80 | 60 | 70 | 90 |
| | Butyl acrylate (%) | 20 | 5 | 5 | 20 | 40 | 30 | 10 |
| (III-2) | Monomer mixture (d) per 100 parts of total monomers of (B) (part(s)) | 0 | 8 | 0 | 0 | 0 | 0 | 0 |
| | Methyl methacrylate (%) | 0 | 52 | 0 | 0 | 0 | 0 | 0 |
| | Butyl acrylate (%) | 0 | 48 | 0 | 0 | 0 | 0 | 0 |
| Gel fraction (%) | | 79.4 | 93.7 | 85.9 | 79.0 | 79.9 | 79.7 | 79.2 |

TABLE 2

| | | Production Example 8 | Production Example 9 | Production Example 10 | Production Example 11 | Production Example 12 | Production Example 13 |
|---|---|---|---|---|---|---|---|
| Graft copolymer (B) | | B8 | B9 | B10 | B11 | B12 | B13 |
| Polymerization stage (I) | Monomer mixture (a) per 100 parts of total monomers of (B) (part(s)) | 27 | 27 | 27 | 27 | 27 | 27 |
| | Methyl methacrylate (%) | 93.2 | 93.2 | 93.2 | 93.2 | 93.2 | 93.2 |
| | Butyl acrylate (%) | 6 | 6 | 6 | 6 | 6 | 6 |
| | Styrene (%) | 0.8 | 0.8 | 0.8 | 0.8 | 0.8 | 0.8 |
| | Allyl methacrylate per 100 parts of total monomers of (B) (part(s)) | 0.135 | 0.135 | 0.135 | 0.135 | 0.135 | 0.135 |
| | n-OM per 100 parts of total monomers of (B) (part(s)) | 0.3 | 0.6 | 0.45 | 0.15 | 0 | 0.3 |

TABLE 2-continued

|  |  |  | Production Example 8 | Production Example 9 | Production Example 10 | Production Example 11 | Production Example 12 | Production Example 13 |
|---|---|---|---|---|---|---|---|---|
|  |  | t-DM per 100 parts of total monomers of (B) (part(s)) | 0 | 0 | 0 | 0 | 0 | 0 |
|  |  | Emulsifier per 100 parts of total monomers of (B) (part(s)) | 0.09 | 0.09 | 0.09 | 0.09 | 0.09 | 0.09 |
| Polymerization stage (II) |  | Monomer mixture (b) per 100 parts of total monomers of (B) (part(s)) | 50 | 50 | 50 | 50 | 50 | 50 |
|  |  | Methyl methacrylate (%) | 0 | 0 | 0 | 0 | 0 | 0 |
|  |  | Butyl acrylate (%) | 82 | 82 | 82 | 82 | 82 | 82 |
|  |  | Styrene (%) | 18 | 18 | 18 | 18 | 18 | 18 |
|  |  | Allyl methacrylate per 100 parts of total monomers of (B) (part(s)) | 0.75 | 0.75 | 0.75 | 0.75 | 0.75 | 0.75 |
|  |  | PEG#600DA per 100 parts of total monomers of (B) (part(s)) | 0 | 0 | 0 | 0 | 0 | 0 |
|  |  | Emulsifier per 100 parts of total monomers of (B) (part(s)) | 0.2 | 0.2 | 0.2 | 0.2 | 0.2 | 0.2 |
| Average particle diameter (nm) at the time of completion of polymerization stage (II) |  |  | 225 | 233 | 234 | 215 | 196 | 220 |
| Polymerization stage (III) | (III-1) | Monomer mixture (c) per 100 parts of total monomers of (B) (part(s)) | 23 | 23 | 23 | 23 | 23 | 23 |
|  |  | Methyl methacrylate (%) | 95 | 80 | 80 | 80 | 80 | 80 |
|  |  | Butyl acrylate (%) | 5 | 20 | 20 | 20 | 20 | 20 |
|  | (III-2) | Monomer mixture (d) per 100 parts of total monomers of (B) (part(s)) | 0 | 0 | 0 | 0 | 0 | 0 |
|  |  | Methyl methacrylate (%) | 0 | 0 | 0 | 0 | 0 | 0 |
|  |  | Butyl acrylate (%) | 0 | 0 | 0 | 0 | 0 | 0 |
| Gel fraction (%) |  |  | 79.4 | 73.8 | 75.2 | 88.2 | 97.6 | 79.4 |

In Tables 1 and 2, the emulsifier represents polyoxyethylene lauryl ether phosphoric acid, n-OM represents n-octyl mercaptan, and t-DM represents t-dodecyl mercaptan. The same applies to Table 3 below.

(Method of Measuring Average Particle Diameter of Core Layer of Graft Copolymer (at the Time of Completion of Polymerization Stage (II)))

The average particle diameter was measured in a state of latex obtained by performing polymerization up to the polymerization stage (II). Ratio Beam Spectrophotometer U-5100 manufactured by Hitachi High-Technologies Corporation was used as a measuring apparatus, and the average particle diameter was determined by using light scattering at a wavelength of 546 nm.

(Method of Measuring Gel Fraction of Graft Copolymer)

About 40 ml of methyl ethyl ketone (MEK) was added to about 1 g of the graft copolymer and left to stand overnight. Thereafter, an operation in which stirring was performed with a stirrer chip for 30 minutes, and centrifugation was performed at 12° C. for 1 hour at 30,000 rpm by using a centrifuge (CP80NX from Hitachi Koki Co., Ltd.) was repeated for three sets to separate components into a polymer component insoluble in MEK (gel polymer, GP) and components soluble in MEK. The obtained gel polymer was dried at 60° C. and 5 torr for 10 hours by using a vacuum dryer VOS-450VD from Tokyo Rikakikai Co., Ltd. to recover the dried gel polymer. Furthermore, with regard to the MEK soluble component, the MEK soluble component was poured into about 200 ml of methanol and reprecipitated to be separated into a methanol soluble matter (soluble matter) and a methanol insoluble matter (free polymer, FP). The methanol soluble matter and the methanol insoluble matter were dried under the same conditions as above to recover the dried free polymer and the dried soluble matter. The gel fraction (%) was calculated by the following equation:

(Gel fraction)=(GP weight after drying)/(GP weight after drying+FP weight after drying+soluble matter weight after drying)×100

(Method of Measuring Degree of Swelling by MEK of Graft Copolymer) The polymer component insoluble in MEK (gel polymer, GP) was separated in the same manner as described above and then dried under the same conditions as described above to recover the dried gel polymer. From the weight of GP before drying (GP in the state of containing MEK) and the weight of GP after drying, the degree of swelling by methyl ethyl ketone was calculated by the following equation:

(Degree of swelling)=[(GP weight before drying)−(GP weight after drying)]/(GP weight after drying)

Production Example 14

<Production of Glutarimide Acrylic-Based Resin (A2)>

An extruder used was an intermeshing co-rotating double-screw extruder (L/D=90) with a bore of 40 mm. The temperature of each temperature control zone of the extruder was set to 250 to 280° C., and the screw rotational speed was set to 85 rpm. A polymethyl methacrylate resin (weight average molecular weight: 105,000) was supplied at 42.4 kg/hr, and the resin was melted in a kneading block to fill the kneading block with the melted resin, and then monomethylamine (manufactured by Mitsubishi Gas Chemical Company, Inc.) was injected through a nozzle in an amount of 2.0 parts by weight with respect to 100 parts by weight of the polymethyl methacrylate resin. The end of a reaction zone was equipped with a reverse flight so that the reaction zone was filled with the resin. The pressure in a vent port was reduced to −0.090 MPa to remove a by-product and excess methylamine after the reaction. The resin extruded as a strand through the die provided at the outlet port of the extruder was cooled in a water tank and then pelletized by a pelletizer to obtain a resin (I).

Then, an intermeshing co-rotating double-screw extruder with a bore of 40 mm was used, and the temperature of each temperature control zone of the extruder was set to 240 to 260° C., and the screw rotational speed was set to 72 rpm.

The resin (1) obtained from the hopper was supplied at 41 kg/hr, and the resin was melted in a kneading block to fill the kneading block with the melted resin, and dimethyl carbonate was injected through a nozzle in an amount of 3.2 parts by weight with respect to 100 parts by weight of the polymethyl methacrylate resin to reduce carboxyl groups in the resin. The end of a reaction zone was equipped with a reverse flight so that the reaction zone was filled with the resin. The pressure in a vent port was reduced to −0.092 MPa to remove a by-product and excess dimethyl carbonate after the reaction. The resin extruded as a strand through the die provided at the outlet port of the extruder was cooled in a water tank and then pelletized by a pelletizer to obtain a glutarimide acrylic-based resin (A2). The imidization ratio, glutarimide content, glass transition temperature, and refractive index of the glutarimide acrylic-based resin (A2) were measured by the above-described methods. As a result, the glutarimide acrylic-based resin (A2) had an imidization ratio of 13 mol %, a glutarimide content of 7% by weight, a glass transition temperature of 125° C., and a refractive index of 1.50.

Examples 1 and 2, Comparative Example 1

<Making of Pellet>
Ninety parts by weight of the acrylic-based resin (A1) and 10 parts by weight of the graft copolymer (B) described in Table 3 were kneaded and extruded at temperatures set to 200° C. at C1 to C3, 210° C. at C4, 220° C. at C5, and 230° C. at D using a single-screw extruder equipped with a vent (HW-40-28: 40 m/m, L/D=28 manufactured by Tabata Industrial Machinery Co., Ltd.) to be pelletized. As the acrylic-based resin (A1), SUMIPEX LG (weight average molecular weight 83,000) manufactured by Sumitomo Chemical Co., Ltd. was used.
<Making of Dope>
Sixty grams of methylene chloride was added to 15 g of the pellet obtained above and left to stand for 30 minutes, and then the mixture was stirred by hand for 1 minute, left to stand for 6 hours, stirred by hand for 1 minute, left to stand for 12 hours, stirred by hand for 1 minute, left to stand for 20 minutes, and stirred with a stirrer chip for 5 hours to prepare dopes each containing the acrylic-based resin, the graft copolymer and methylene chloride (H=7.1) (the solid content concentration in the dope: 20% by weight, and the graft copolymer concentration in the resin component: 10% by weight).

Examples 3 to 10, Comparative Example 2

<Making of Dope Preparation Solution of Graft Copolymer (B)>
Six grams of the graft copolymer (B) described in Table 3 was poured into 114 g of methylene chloride and left to stand for 14 hours, and then the mixture was stirred by hand for 1 minute, left to stand for 20 minutes, and stirred with a stirrer chip for 5 hours to prepare dope preparation solutions of the graft copolymer (the graft copolymer concentration: 5% by weight).
<Making of Dope Preparation Solution of Acrylic-Based Resin (A)>
Thirty grams of the acrylic-based resin (A1) was poured into 70 g of methylene chloride and left to stand for 14 hours, and then the mixture was stirred by hand for 1 minute and left to stand for 20 minutes to prepare dope preparation solutions of the acrylic-based resin (the acrylic-based resin concentration: 30% by weight).
<Making of Dope>
Thirty grams of each of the dope preparation solutions of the graft copolymer obtained above and 45 g of each of the dope preparation solutions of the acrylic-based resin were mixed and left to stand for 30 minutes, and then the mixture was stirred by hand for 1 minute, left to stand for 6 hours, stirred by hand for 1 minute, left to stand for 12 hours, stirred by hand for 1 minute, left to stand for 20 minutes, and stirred with a stirrer chip for 5 hours to prepare dopes each containing the acrylic-based resin, the graft copolymer and methylene chloride (the solid content concentration in the dope: 20% by weight, and the graft copolymer concentration in the resin component: 10% by weight).

Example 11

<Making of Pellet>
Sixty parts by weight of the glutarimide acrylic-based resin (A2) obtained in Production Example 14 and 40 parts by weight of the graft copolymer (B13) were kneaded and extruded at temperatures set to 200° C. at C1 to C3, 210° C. at C4, 220° C. at C5, and 230° C. at D using a single-screw extruder equipped with a vent (HW-40-28: 40 m/m, L/D=28 manufactured by Tabata Industrial Machinery Co., Ltd.) to be pelletized.
<Making of Dope>
Sixty grams of methylene chloride was added to 15 g of the pellet obtained above and left to stand for 30 minutes, and then the mixture was stirred by hand for 1 minute, left to stand for 6 hours, stirred by hand for 1 minute, left to stand for 12 hours, stirred by hand for 1 minute, left to stand for 20 minutes, and stirred with a stirrer chip for 5 hours to prepare a dope containing the acrylic-based resin (A2), the graft copolymer (B13) and methylene chloride (the solid content concentration in the dope: 20% by weight, and the graft copolymer concentration in the resin component: 40% by weight).

As a result of measuring the haze of the obtained dope, the haze was as excellent as 4%. Furthermore, no lump of undispersed graft copolymer was observed in the dope, and a dope could be obtained in which the graft copolymer was uniformly dispersed.

Example 12

<Making of Dope Preparation Solution of Graft Copolymer (B13)>
Twenty-four grams of the graft copolymer (B13) was poured into 96 g of methylene chloride and left to stand for 14 hours, and then the mixture was stirred by hand for 1 minute, left to stand for 20 minutes, and stirred with a stirrer chip for 5 hours to prepare a dope preparation solution of the graft copolymer (the graft copolymer concentration: 20% by weight).
<Making of Dope Preparation Solution of Acrylic-Based Resin (A2)>
Thirty grams of the acrylic-based resin (A2) was poured into 70 g of methylene chloride and left to stand for 14 hours, and then the mixture was stirred by hand for 1 minute and left to stand for 20 minutes to prepare a dope preparation solution of the acrylic-based resin (A2) (the acrylic-based resin concentration: 30% by weight).
<Making of Dope>
Thirty grams of the dope preparation solution of the graft copolymer (B13) obtained above, 30 g of the dope preparation solution of the acrylic-based resin (A2) obtained above, and 15 g of methylene chloride were mixed and left to stand for 30 minutes, and then the mixture was stirred by hand for 1 minute, left to stand for 6 hours, stirred by hand for 1 minute, left to stand for 12 hours, stirred by hand for 1 minute, left to stand for 20 minutes, and stirred with a stirrer chip for 5 hours to prepare a dope containing the acrylic-based resin (A2), the graft copolymer (B13) and methylene chloride (the solid content concentration in the dope: 20% by weight, and the graft copolymer concentration in the resin component: 40% by weight).

Although many lumps of undispersed graft copolymer were observed visually in the obtained dope, as a result of measuring the haze of the dope, the haze was as excellent as 3%.

Example 13

Six grams of the graft copolymer (B13), 9 g of the acrylic-based resin (A2), and 60 g of methylene chloride were mixed without being pelletized and left to stand for 30 minutes, and then the mixture was stirred by hand for 1 minute, left to stand for 6 hours, stirred by hand for 1 minute, left to stand for 12 hours, stirred by hand for 1 minute, left to stand for 20 minutes, and stirred with a stirrer chip for 5 hours to prepare a dope containing the acrylic-based resin (A2), the graft copolymer (B13) and methylene chloride (the solid content concentration in the dope: 20% by weight, and the graft copolymer concentration in the resin component: 40% by weight).

Although a few lumps of undispersed graft copolymer were observed visually in the obtained dope, as a result of measuring the haze of the dope, the haze was as excellent as 4%.

Comparative Example 3

In the same manner as in Example 12 except that the graft copolymer (B2) was used instead of the graft copolymer (B13), a dope containing the acrylic-based resin (A2), the graft copolymer (B2) and methylene chloride (the solid content concentration in the dope: 20% by weight, and the graft copolymer concentration in the resin component: 40% by weight) was prepared.

<Method of Measuring Haze of Dope>

The haze of the dope obtained in each example and comparative example was measured by using quartz cell with an optical path length of 10 mm and a turbidimeter (NDH 4000 manufactured by Nippon Denshoku Industries Co., Ltd.) in accordance with JIS K7136. The haze value of each dope obtained was evaluated based on the following criteria.

S: The haze value is less than 20%, and undispersed lumps are not observed in the dope.
A: The haze value is less than 20%
B: The haze value is 20% or more and less than 23%
C: The haze value is 23% or more and less than 30%
D: The haze value is 30% or more and less than 40%
E: The haze value is 40% or more

TABLE 3

|  | Acrylic resin (A) | Graft copolymer (B) Type | Graft copolymer (B) Concentration (wt %) | Amount of butyl acrylate in shell layer (%) | Tg of shell layer (° C.) Comparative Example 1 is Tg of (III-1) | Amount of n-OM in polymerization stage (I) (part(s)) | Amount of t-DM in polymerization stage (I) (part(s)) | Soft polymer ratio in core layer (%): (II)/(I) + (II) | Average particle diameter of core layer (nm) |
|---|---|---|---|---|---|---|---|---|---|
| Example 1 | A1 | B1 | 10 | 20 | 57.1 | 0.3 | 0 | 64.9 | 257 |
| Example 2 | A1 | B3 | 10 | 5 | 91.8 | 0.089 | 0 | 89.6 | 125 |
| Example 3 | A1 | B4 | 10 | 20 | 57.1 | 0.3 | 0 | 64.9 | 224 |
| Example 4 | A1 | B5 | 10 | 40 | 19.9 | 0.3 | 0 | 64.9 | 229 |
| Example 5 | A1 | B6 | 10 | 30 | 37.4 | 0.3 | 0 | 64.9 | 230 |
| Example 6 | A1 | B7 | 10 | 10 | 79.4 | 0.3 | 0 | 64.9 | 226 |
| Example 7 | A1 | B8 | 10 | 5 | 91.8 | 0.3 | 0 | 64.9 | 225 |
| Example 8 | A1 | B9 | 10 | 20 | 57.1 | 0.6 | 0 | 64.9 | 233 |
| Example 9 | A1 | B10 | 10 | 20 | 57.1 | 0.45 | 0 | 64.9 | 234 |
| Example 10 | A1 | B11 | 10 | 20 | 57.1 | 0.15 | 0 | 64.9 | 215 |
| Example 11 | A2 | B13 | 40 | 20 | 57.1 | 0.3 | 0 | 64.9 | 220 |
| Example 12 | A2 | B13 | 40 | 20 | 57.1 | 0.3 | 0 | 64.9 | 220 |
| Example 13 | A2 | B13 | 40 | 20 | 57.1 | 0.3 | 0 | 64.9 | 220 |
| Comparative Example 1 | A1 | B2 | 10 | 5.48 | 91.8 | 0 | 0.1 | 64.9 | 225 |
| Comparative Example 2 | A1 | B12 | 10 | 20 | 57.1 | 0 | 0 | 64.9 | 196 |
| Comparative Example 3 | A2 | B2 | 40 | 5.48 | 91.8 | 0 | 0.1 | 64.9 | 225 |

TABLE 4

|  | Degree of swelling by MEK | Swellability coefficient S | Gel fraction (%) | Dope Haze (%) | Dope Haze evaluation | Form of (B) in preparation of dope | Initial mixture form of (B) | Concentration of (B) at the time of initial mixing (wt %) |
|---|---|---|---|---|---|---|---|---|
| Example 1 | 4.1 | 12.6 | 79.4 | 20 | B | Mixed pellet | Mixed pellet + solvent | 2 |
| Example 2 | 10.7 | 17.2 | 85.9 | 32 | D | Mixed pellet | Mixed pellet + solvent | 2 |
| Example 3 | 4.1 | 12.6 | 79 | 14 | A | Powder | Powder + solvent | 5 |
| Example 4 | 4.5 | 13.9 | 79.9 | 14 | A | Powder | Powder + solvent | 5 |
| Example 5 | 4.4 | 13.6 | 79.7 | 15 | A | Powder | Powder + solvent | 5 |
| Example 6 | 3.7 | 11.4 | 79.2 | 24 | C | Powder | Powder + solvent | 5 |

TABLE 4-continued

|  | Degree of swelling by MEK | Gel Swellability coefficient S | Gel fraction (%) | Dope Haze (%) | Dope Haze evaluation | Form of (B) in preparation of dope | Initial mixture form of (B) | Concentration of (B) at the time of initial mixing (wt %) |
|---|---|---|---|---|---|---|---|---|
| Example 7 | 3.5 | 10.8 | 79.4 | 33 | D | Powder | Powder + solvent | 5 |
| Example 8 | 4.2 | 12.9 | 73.8 | 21 | B | Powder | Powder + solvent | 5 |
| Example 9 | 4.1 | 12.6 | 75.2 | 18 | A | Powder | Powder + solvent | 5 |
| Example 10 | 3.6 | 11.1 | 88.2 | 18 | A | Powder | Powder + solvent | 5 |
| Example 11 | 3.8 | 11.7 | 79.4 | 4 | S | Mixed pellet | Mixed pellet + solvent | 8 |
| Example 12 | 3.8 | 11.7 | 79.4 | 3 | A | Powder | Powder + solvent | 20 |
| Example 13 | 3.8 | 11.7 | 79.4 | 4 | A | Powder | Powder + (A) + solvent | 8 |
| Comparative Example 1 | 3.3 | 10.2 | 93.7 | 42 | E | Mixed pellet | Mixed pellet + solvent | 2 |
| Comparative Example 2 | 2.6 | 8.0 | 97.6 | 64 | E | Powder | Powder + solvent | 5 |
| Comparative Example 3 | 3.3 | 10.2 | 93.7 | 62 | E | Powder | Powder + solvent | 20 |

<Making of Cast Film>

About 20 ml of the dope obtained in each of Examples 1 to 13 was dropped on a glass plate (30 cm×30 cm), and a doped film was formed using a 200 μm thick applicator. The doped film was then primary-dried at 90° C. for 10 minutes and further secondary-dried at 120° C. for 5 minutes to make a cast film.

<Method of Measuring Dissolution Rate>

The dissolution rate in preparing the dope for Example 1 and Comparative Example 1 was measured by the following procedures. A stirrer chip, 8 g of a solvent, and 2 g of a pellet were put in a container and stirred with a magnetic stirrer at a rotational speed of 200 rpm, and the time to complete dissolution was visually measured and determined as the dissolution rate. The results are shown in Table 5.

Comparative Example 4

A dope was prepared in the same manner as in Example 1 except that methyl ethyl ketone ($\delta H$=5.1) was used as the solvent instead of methylene chloride. The haze of the dope was measured by the above method. The dissolution rate in preparing the dope was measured by the above method. The results are shown in Table 5.

Comparative Example 5

A dope was prepared in the same manner as in Comparative Example 1 except that methyl ethyl ketone was used as the solvent instead of methylene chloride. The haze of the dope was measured by the above method. The dissolution rate in preparing the dope was measured by the above method. The results are shown in Table 5.

Comparative Example 6

A dope was prepared in the same manner as in Example 1 except that N, N-dimethylformamide ($\delta H$=11.3) was used as the solvent instead of methylene chloride. The haze of the dope was measured by the above method. The dissolution rate in preparing the dope was measured by the above method. The results are shown in Table 5.

Comparative Example 7

A dope was prepared in the same manner as in Comparative Example 1 except that N,N-dimethylformamide was used as the solvent instead of methylene chloride. The haze of the dope was measured by the above method. The dissolution rate in preparing the dope was measured by the above method. The results are shown in Table 5.

TABLE 5

|  | Acrylic resin (A) | Graft copolymer (B) Type | Graft copolymer (B) Concentration (wt %) | Solvent Type | Solvent $\delta H$ | Haze of dope (%) | Dissolution rate (min) |
|---|---|---|---|---|---|---|---|
| Example 1 | A1 | B1 | 10 | Methylene chloride | 7.1 | 20 | 25 |
| Comparative Example 1 | A1 | B2 | 10 | Methylene chloride | 7.1 | 42 | 20 |
| Comparative Example 4 | A1 | B1 | 10 | Methyl ethyl ketone | 5.1 | 54 | 165 |
| Comparative Example 5 | A1 | B2 | 10 | Methyl ethyl ketone | 5.1 | 79 | 170 |
| Comparative Example 6 | A1 | B1 | 10 | N,N-dimethylformamide | 11.3 | 33 | 520 |
| Comparative Example 7 | A1 | B2 | 10 | N,N-dimethylformamide | 11.3 | 44 | 530 |

The invention claimed is:

1. A method for producing an acrylic-based resin film by a solution casting method, the method comprising:
    casting a dope on a surface of a support; and then evaporating the solvent,
    wherein the dope comprises:
        a thermoplastic acrylic-based resin;
        a graft copolymer; and
        a solvent,
    wherein
        the graft copolymer has a core layer having an average particle diameter of from 125 to 400 nm and a shell layer, has a degree of swelling by methyl ethyl ketone of 3.5 or more, and has a gel fraction of 90% or less, wherein the gel fraction is a weight ratio of a component of the graft copolymer insoluble in methyl ethyl ketone to a total amount of the graft copolymer,
        the solvent has a hydrogen bonding term δH in a Hansen solubility parameter of from 6.0 to 8.0,
        the core layer of the graft copolymer has a polymer terminal structure comprising an alkylthio group,
        the core layer of the graft copolymer comprises a hard polymer (I) and a soft polymer (II) bonded to the hard polymer (I),
        the hard polymer (I) comprises, as structural units, from 40 to 100% by weight of a methacrylic ester unit (a-1), from 60 to 0% by weight of another monomer unit (a-2) comprising a double bond copolymerizable with the methacrylic ester unit (a-1), and from 0.01 to 10 parts by weight of a polyfunctional monomer unit, per 100 parts by weight of a total amount of the (a-1) and the (a-2),
        the soft polymer (II) comprises, as structural units, from 60 to 100% by weight of an acrylic ester unit (b-1), from 0 to 40% by weight of another monomer unit (b-2) having a double bond copolymerizable with the acrylic ester unit (b-1), and from 0.1 to 5 parts by weight of a polyfunctional monomer unit, per 100 parts by weight of a total amount of the (b-1) and the (b-2),
        the shell layer of the graft copolymer comprises a hard polymer (III) graft-bonded to the hard polymer (I) and/or the soft polymer (II) and comprising, as structural units, from 60 to 90% by weight of a methacrylic ester unit (c-1), from 40 to 10% by weight of an acrylic ester unit (c-2) comprising a double bond copolymerizable with the methacrylic ester unit (c-1), and from 0 to 10 parts by weight of a polyfunctional monomer unit, per 100 parts by weight of a total amount of the (c-1) and the (c-2), and
        a proportion of the total amount of the thermoplastic acrylic-based resin and the graft copolymer in the dope is from 5 to 50% by weight.

2. The method of claim 1, wherein the graft copolymer has a swellability coefficient S of from 10.5 to 18.0, wherein the swellability coefficient S is calculated by:

(degree of swelling by methyl ethyl ketone/soft polymer ratio in graft copolymer)/(soft polymer ratio in core layer).

3. The method of claim 1, wherein the shell layer of the graft copolymer is a single layer or a multilayer, and the single layer or a layer having a highest glass transition temperature in the multilayer comprises a polymer having a glass transition temperature of 92° C. or lower.

4. The method of claim 1, wherein the hard polymer (I) has a polymer terminal structure comprising an alkylthio group.

5. The dope according to claim 1, wherein the thermoplastic acrylic-based resin has a weight average molecular weight of at least 300,000.

6. The method of claim 1, wherein the thermoplastic acrylic-based resin has a weight average molecular weight of 170,000 or less.

7. The method of claim 1, wherein the thermoplastic acrylic-based resin is a polymer comprising, as structural units, from 30 to 100% by weight of a methyl methacrylate unit and from 0 to 70% by weight of another vinyl monomer unit copolymerizable with the methyl methacylate unit.

8. The method of claim 1, wherein
    the thermoplastic acrylic-based resin has a ring structure in a main chain, and
    the ring structure is at least one selected from the group consisting of a glutarimide ring structure, a lactone ring structure, a ring structure derived from maleic anhydride, a ring structure derived from maleimide, and a glutaric anhydride ring structure.

9. The method of claim 1, wherein the thermoplastic acrylic-based resin is comprised in an amount of from 30 to 98 parts by weight and the graft copolymer is comprised in an amount of from 70 to 2 parts by weight, per 100 parts by weight of a total of the amount of the thermoplastic acrylic-based resin and the amount of the graft copolymer.

10. The method according to claim 1, wherein the dope is prepared by making a pellet comprising the thermoplastic acrylic-based resin and the graft copolymer, and then dissolving and dispersing the pellet in the solvent.

11. An acrylic-based resin film produced by the method of claim 1.

12. The acrylic-based resin film according to claim 11, which has a thickness of from 10 to 500 μm.

13. A substrate, having the acrylic-based resin film according to claim 11 laminated on a surface of the substrate.

14. An optical film, comprising the acrylic-based resin film according to claim 11.

15. A polarizer protective film, comprising the optical film according to claim 14.

16. A polarizing plate, comprising:
    a polarizer; and
    the polarizer protective film according to claim 15 stacked on the polarizer.

17. A display device, comprising:
    the polarizing plate according to claim 16.

* * * * *